(12) United States Patent
Miyaki et al.

(10) Patent No.: US 7,236,349 B2
(45) Date of Patent: Jun. 26, 2007

(54) ELECTRODE FOR ELECTROCHEMICAL CAPACITOR AND METHOD FOR MANUFACTURING THE SAME, ELECTROCHEMICAL CAPACITOR AND METHOD FOR MANUFACTURING THE SAME

(75) Inventors: Yousuke Miyaki, Tokyo (JP); Kazuo Katai, Tokyo (JP); Hideki Tanaka, Tokyo (JP); Kiyonori Hinoki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/990,556

(22) Filed: Nov. 18, 2004

(65) Prior Publication Data

US 2005/0128684 A1 Jun. 16, 2005

(30) Foreign Application Priority Data

Nov. 20, 2003 (JP) ............................ P2003-391282

(51) Int. Cl.
*H01G 9/02* (2006.01)
*H01G 9/00* (2006.01)
(52) U.S. Cl. ...................... 361/502; 361/503; 29/25.03
(58) Field of Classification Search ........ 361/502–503; 29/25.03
See application file for complete search history.

(56) References Cited

U.S. PATENT DOCUMENTS

| 4,992,910 | A | * | 2/1991 | Evans | ........................ 361/502 |
| 6,456,484 | B1 | * | 9/2002 | Matsuoka et al. | .......... 361/511 |
| 2002/0126439 | A1 | * | 9/2002 | Sato et al. | .................. 361/502 |

FOREIGN PATENT DOCUMENTS

| JP | A 01-227417 | | 9/1989 |
| JP | 04068517 A | * | 3/1992 |
| JP | A-11-317332 | | 11/1999 |
| JP | A 2000-252175 | | 9/2000 |
| JP | 2001143973 A | * | 5/2001 |

* cited by examiner

*Primary Examiner*—Eric W. Thomas
(74) *Attorney, Agent, or Firm*—Oliff & Berridge, PLC

(57) ABSTRACT

The present invention is an electrode for an electrochemical capacitor provided with a collector having electronic conductivity and a porous body layer having electronic conductivity, the porous body layer containing porous particles having electronic conductivity and a binder which is able to bind the porous particles with one another, wherein the content of the porous particles in the porous body layer is in a range from 88 to 92% by mass on the basis of the total amount of the porous body layer, and the porous body layer has an apparent density in a range from 0.62 to 0.70 g/cm$^3$.

22 Claims, 18 Drawing Sheets

ELECTRODE FOR ELECTROCHEMICAL CAPACITOR AND METHOD FOR MANUFACTURING THE SAME, ELECTROCHEMICAL CAPACITOR AND METHOD FOR MANUFACTURING THE SAME

BACKGROUND OF THE INVENTION

1. Field of the Invention

The present invention relates to an electrode for electrochemical capacitor and a method for manufacturing the same, and to an electrochemical capacitor and a method for manufacturing the same.

2. Related Background Art

Electrochemical capacitors represented by electric double layer capacitors are readily available in small size and light weight. Owing to the advantage, the electrochemical capacitors are expected, for example, as backup power source for handy equipment (miniature electronics equipment) and the like, auxiliary power source for electric cars and hybrid cars, and other power sources. Various studies have been given to improve the performance of these electrochemical capacitors. Particularly when large capacity is required as the power source of electric car and the like, there is wanted the development of electrochemical capacitors having high electrostatic capacity per unit volume of electrode, (hereinafter referred to as the "volume capacitance").

The electrodes used in those types of electrochemical capacitors are fabricated by forming a porous body layer having electronic conductivity on a collector having electronic conductivity. The porous body layer is generally formed by applying a liquor containing porous particles, a conductive assistant, a binder, and a liquid onto the collector.

The conductive assistant as a component of the porous body layer is used mainly to give sufficient electronic conductivity to the porous body layer. The content of the conductive assistant in the porous body layer is conventionally in an approximate range from 10 to 20% by mass based on the total amount of the porous body layer. Subjecting to the content range, the content of porous particles and the content of binder have been adjusted to approximately from 20 to 80% by mass and from 5 to 40% by mass, respectively, (refer to, for example, JP-A-1-227417, (the term "JP-A-" referred to herein signifies the "Japanese Patent Laid-Open Publication")). Furthermore, by adjusting the contents of respective components (porous particles, conductive assistant, and binder) in the porous body layer to further suitable range within the above-specified range, the volume capacitance of the electrode has been improved.

SUMMARY OF THE INVENTION

The inventors of the present invention found that, when the porous body layer is formed by adjusting the contents of respective above-given components within the respective above-specified ranges, the improvement in the volume capacitance of electrode has a limitation, thus it is difficult to attain an electrode for electrochemical capacitor having excellent volume capacitance requested for the application of the electrochemical capacitor to the power source of electric cars and the like, or 15 F/cm$^3$ or more, preferably 16 F/cm$^3$ or more, and more preferably 17 F/cm$^3$ or more.

The present invention has been derived to solve the above-described problems of conventional technology, and intends to provide an electrode for electrochemical capacitor, having excellent volume capacitance (15 F/cm$^3$ or more, preferably 16 F/cm$^3$ or more, and more preferably 17 F/cm$^3$ or more), to provide a method for manufacturing an electrode for electrochemical capacitor, which method is able to efficiently and surely manufacture that type of electrode, to provide an electrochemical capacitor using the above-described electrode for electrochemical capacitor having excellent electrostatic capacity, and to provide a method for manufacturing an electrochemical capacitor, which method is able to efficiently and surely manufacture that type of electrochemical capacitor.

The present inventors carried out intensive studies to achieve the above-given objects, and found that the objects are achieved if only the electrode is the one, for electrochemical capacitor, which contains porous particles at a specific content and which forms a porous body layer having a specific apparent density on the collector, thus completed the present invention.

That is, the present invention provides an electrode for electrochemical capacitor, containing a collector having electronic conductivity and a porous body layer having electronic conductivity, which porous body layer contains porous particles having electronic conductivity and a binder which is able to bind the porous particles with each other, while the content of the porous particles in the porous body layer is in a range from 88 to 92% by mass on the basis of the total amount of porous body layer, and the porous body layer has an apparent density from 0.62 to 0.70 g/cm$^3$.

The term "apparent density" referred to herein signifies the density expressed by "(mass of the porous body layer)/(volume of the porous body layer (the volume includes internal space of the porous body layer not connecting with external space))". The apparent density is the one calculated, for example, from the mass and the thickness of porous body layer per 100 cm$^2$ of area.

As described before, the conventional electrode for electrochemical capacitor adjusts the contents of respective components (porous particles, conductive assistant, and binder) in the porous body layer within a specific range, thus improving the volume capacitance of electrode. When the content of conductive assistant or binder is increased to above the specified range, the content of porous particles that contribute to the charge and discharge of the electrochemical capacitor relatively decreases. As a result, the amount of porous particles per unit volume of the porous body layer decreases, which tends to decrease the volume capacitance of the electrode. On the other hand, when the content of porous particles is increased above the specified range, the apparent density of the porous body layer likely decreases, and the strength of coating film tends to become insufficient. To cope with the tendency, the content of binder has to be increased to compensate the reduction in the coating film strength caused by the increase in the content of porous particles, which further needs the increase in the content of conductive assistant to compensate the reduction in the electronic conductivity of the porous body layer resulted from further increase in the binder content. As a result, increase in the content of porous particles in the porous body layer has been accepted as difficult.

To this point, the present inventors found that a porous body layer having sufficient apparent density is formed by adopting extremely large amount of porous particles in the porous body layer, as large as 88 to 92% by mass, compared with conventional content levels, and that a porous body layer having satisfactory strength of coating film requested to the porous body layer is formed with a minimum amount of binder required to form the porous body layer.

Consequently, according to the electrode for electrochemical capacitor of the present invention, having a porous body layer containing the porous particles at above-given content and giving an apparent density in a range from 0.62 to 0.70 g/cm$^3$, excellent volume capacitance (15 F/cm$^3$ or more, preferably 16 F/cm$^3$ or more, and more preferably 17 F/cm$^3$ or more) can be attained.

The content of the binder in the porous body layer is preferably in a range from 6.5 to 12% by mass on the basis of the total amount of porous body layer. By specifying the content of binder in that range, the coating film strength of the porous body layer becomes more satisfactory.

The porous body layer is preferably structured by the porous particles in a range from 88 to 92% by mass, the binder in a range from 6.5 to 12% by mass, and the conductive assistant having electronic conductivity in a range from 0 to 1.5% by mass, on the basis of the total amount of the porous body layer.

With that type of porous body layer, the apparent density can be readily and surely adjusted to a range from 0.62 to 0.70 g/cm$^3$, and the coating film strength of the porous body layer can be further increased. Thereby the electrode for electrochemical capacitor according to the present invention provided with that type of porous body layer gains further excellent volume capacitance.

Although the detail mechanism to attain a porous body layer having satisfactory apparent density with that large content of porous particles as described above and with that small content of the conductive assistant (or containing no conductive assistant) is not fully analyzed, the present inventors has an assumption as described below. Average size of porous particles as a component of the porous body layer of the electrode for electrochemical capacitor is normally in a range from several micrometers to several tens of micrometers, and the average particle size of the conductive assistant is normally about several tens of nanometers. Accordingly, the presumable structure of the porous body layer is densely-packed coarse porous particles with the conductive assistant particles entrapped in the gap of porous particles in the porous body layer. If, however, the content of conductive assistant exceeds 1.5% by mass when porous particles is in a range from 88 to 92% by mass, not all of the conductive assistant particles can fully enter the gap of porous particles compared with the case of 1.5% by mass or less of the content, which may likely lead to a state that the conductive assistant particles exist between the porous particles. That condition makes it difficult to establish a state of densely-packed porous particles in the porous body layer, which should decrease the apparent density of the porous body layer. To the contrary, when the content of conductive assistant is 1.5% by mass or less, the conductive assistant particles can enter the gap in the porous particle layer while maintaining the state of densely-packed porous particles. Accordingly, the present inventors speculates that the apparent density of the porous body layer increases compared with the case of exceeding 1.5% by mass of the content of the conductive assistant. Furthermore, according to the speculation of the present inventors, that type of porous body layer contains densely-packed porous particles to structure an ideal conductive network in the porous body layer, thus satisfactory electronic conductivity is attained even when the content of conductive assistant is 1.5% by mass or less.

The above-described porous body layer preferably has a surface with an irregular profile pattern.

The electrode for electrochemical capacitor according to the present invention increases the specific surface area of the porous body layer to attain further excellent volume capacitance by forming an irregular profile pattern on the surface of the porous body layer. Furthermore, thus formed irregular profile pattern also decreases the internal resistance of the electrode for electrochemical capacitor. Although the mechanism of reducing the internal resistance is not fully analyzed, the present inventors speculates as follows. That is, the irregular profile pattern formed on the surface of the porous body layer increases the adhesiveness of the respective components (particularly the porous particles and the conductive assistant) in the porous body layer, thus structuring an ideal conductive network in the porous body layer to improve the electronic conductivity.

Regarding the irregular profile pattern, shape and size of each of the concavities and convexes in a single profile pattern may be the same with or different from each other. Furthermore, each of the concavities and convexes may be arranged regularly in a specific pattern arrangement (for example, a pattern made of concavity and convex) or may be irregularly arranged giving non-uniform spacing between a concavity and convex. The above-described irregular profile pattern includes the case that only one of concavity or convex is formed in plurality thereof on the surface of the electrode for electrochemical capacitor. That is, when solely a plurality of convexes is formed on the surface of electrode for electrochemical capacitor, the groove section positioned between the adjacent convexes is the concavity. To fully attain the increase in the volume capacitance and the decrease in the internal resistance of the electrode for electrochemical capacitance, it is preferred to form the irregular profile pattern over the whole surface of the electrode for electrochemical capacitor. The irregular profile pattern, however, may be formed on a part of the surface of electrode for electrochemical capacitor.

The present invention provides a method for manufacturing electrode for electrochemical capacitor, containing a collector having electronic conductivity and a porous body layer having electronic conductivity, the method comprising the steps of: preparing a coating liquor for forming porous body layer, which coating liquor contains porous particles having electronic conductivity, a binder which is able to bind the porous particles with each other, and a liquid which is able to dissolve or to disperse the binder therein, so that the content of the porous particles in the coating liquor falls within 88 to 92% by mass on the basis of the total amount of solid matter in the coating liquor; forming the porous body layer by applying the coating liquor for forming the porous body layer onto the surface of the collector, followed by removing the liquid to form the porous body layer; and pressing the collector and the porous body layer together so that the apparent density of the porous body layer falls within 0.62 to 0.70 g/cm$^3$.

According to the manufacturing method, an electrode for electrochemical capacitor having excellent volume capacitance, specifically 15 F/cm$^3$ or higher volume capacitance, is effectively and surely fabricated.

The content of the binder in the coating liquor for forming the porous body layer is preferably in a range from 6.5 to 12% by mass on the basis of the total amount of solid matter in the coating liquor for forming the porous body layer.

With that range of the binder content, an electrode for electrochemical capacitor having a porous body layer which has excellent volume capacitance and satisfactory coating film strength can be fabricated effectively and surely.

The coating liquor for forming the porous body layer preferably contains the porous particles in a range from 88 to 92% by mass, the binder in a range from 6.5 to 12% by mass, a conductive assistant having electronic conductivity in a range from 0 to 1.5% by mass, and the liquid, based on the total amount of solid matter in the coating liquor.

With that composition, an electrode for electrochemical capacitance having further excellent volume capacitance can be fabricated further efficiently and surely.

The pressing step is preferably the step of pressing the collector and the porous body layer together by a roll-press. Furthermore, the pressing step is more preferably the step of forming an irregular profile pattern on the surface of the porous body layer by pressing the collector and the porous body layer together using a cylindrical roller having the irregular profile pattern on the face thereof to bring the face of the roller into contact with the surface of the porous body layer.

Forming the irregular profile pattern on the surface of the porous body layer allow the specific surface area of the porous body layer to increase, and an electrode for electrochemical capacitor having further excellent volume capacitance to be fabricated. By forming the irregular profile pattern on the surface of the porous body layer, an electrode for electrochemical capacitor having reduced internal resistance can be fabricated.

The present invention further provides an electrochemical capacitor containing a first electrode and a second electrode facing each other; a separator positioned between the first electrode and the second electrode; an electrolyte solution; and a casing which contains to seal the first electrode, the second electrode, the separator and the electrolyte solution, wherein at least one of or both of the first electrode and the second electrode are the electrode for electrochemical capacitor according to the present invention.

Since the electrochemical capacitor having that structure contains at least one electrode for electrochemical capacitor according to the present invention, excellent electrostatic capacity is attained.

The present invention also provides a method for manufacturing electrochemical capacitor containing a first electrode and a second electrode facing each other, a separator positioned between the first electrode and the second electrode, an electrolyte solution, a casing which contains to seal the first electrode, the second electrode, the separator and the electrolyte solution, the method comprising the steps of: the first step of fabricating the first electrode and the second electrode; the second step of positioning the separator between the first electrode and the second electrode; the third step of encasing the first electrode, the second electrode and the separator in the casing; the fourth step of pouring the electrolyte solution in the casing; and the fifth step of sealing the casing; wherein at least one of the first electrode and the second electrode is fabricated in the first step by the above-described method for manufacturing the electrode for electrochemical capacitor.

According to the manufacturing method, an electrochemical capacitor having excellent electrostatic capacity can be efficiently and surely manufactured.

DESCRIPTION OF PREFERRED EMBODIMENTS

Figure 1:
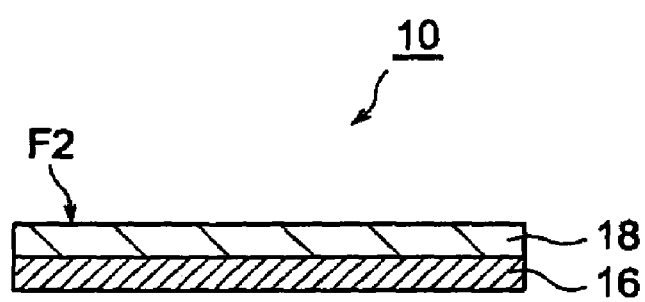
FIG. 1 is a schematic cross sectional view of an electrode for electrochemical capacitance according to the present invention.

A preferred embodiment of the present invention is described in detail referring to the drawings. The description given below gives the same symbol to the same or equivalent section, and no duplicated description is given.

(Electrode for electrochemical capacitor and method for manufacturing same) FIG. 1 is a schematic cross sectional view showing a preferred embodiment of an electrode for electrochemical capacitor according to the present invention. As shown in FIG. 1, the electrode 10 for electrochemical capacitor according to the present invention comprises the collector 16 having electronic conductivity and the porous body layer 18 having electronic conductivity, formed on the collector 16.

The collector 16 is not specifically limited if only it is a good conductive material which allows the electric charge to sufficiently migrate into the porous body layer 18, and a collector used in a publicly known electrode for electrochemical capacitor may be applied. For example, the collector 16 may be a metallic foil such as that of aluminum. Applicable metallic foil includes the one prepared by etching or by rolling or the like without special limitation. The collector 16 in the electrode 10 for electrochemical capacitor is preferably made of aluminum.

The thickness of the collector 16 is preferably in a range from 20 to 50 μm, and more preferably from 20 to 30 μm, from the viewpoint of size reduction and weight reduction of the electrode 10 for electrochemical capacitor.

The porous body layer 18 is a layer which is formed on the collector 16 and which contributes to electric charge and discharge. The porous body layer 18 contains at least porous particles having electronic conductivity and a binder which is able to bind the porous particles with each other as the component materials.

The content of porous particles in the porous body layer 18 is in a range from 88 to 92% by mass on the basis of the total amount of the porous body layer 18. If the content of porous particles is less than 88% by mass, the amount of porous particles per unit volume of the porous body layer decreases, which makes it difficult to attain excellent volume capacitance (15 F/cm$^3$ or more, preferably 16 F/cm$^3$ or more, and more preferably 17 F/cm$^3$ or more). On the other hand, if the content of porous particles exceeds 92% by mass, it is difficult to form a porous body layer having sufficient strength of coating film.

The content of binder is preferably in a range from 6.5 to 12% by mass on the basis of the total amount of the porous body layer 18. Furthermore, the porous body layer 18 preferably comprises 88 to 92% by mass of porous particles, 6.5 to 12% by mass of binder, and 0 to 1.5% by mass of conductive assistant having electronic conductivity, on the basis of the total amount of the porous body layer 18.

With the porous body layer 18 having the above-given structure, a more preferable range of contents of individual components (porous particles, binder, and conductive assistant) is the following. The content of porous particles is more preferably in a range from 89 to 91% by mass, and particularly preferably from 89.5 to 90.5% by mass. The content of binder is more preferably in a range from 8 to 10% by mass, and particularly preferably from 8.5 to 9.5% by mass. The content of conductive assistant is more preferably in a range from 0.5 to 1.5% by mass, and particularly preferably from 0.5 to 1.0% by mass.

The electrode 10 for electrochemical capacitor can attain excellent volume capacitance (15 F/cm$^3$ or more, preferably 16 F/cm$^3$ or more, and more preferably 17 F/cm$^3$ or more) by the presence of porous body layer 18 containing above-given components at the respective above-specified contents. In addition, the porous body layer 18 can attain sufficient coating film strength.

The porous body layer 18 in the electrode 10 for electrochemical capacitor is formed to give the apparent density in a range from 0.62 to 0.70 g/cm$^3$. If the apparent density is less than 0.62 g/cm$^3$, it is difficult to attain excellent volume capacitance since the amount of porous particles per unit volume decreases. If the apparent density exceeds 0.70 g/cm$^3$, and when an electrochemical capacitor is formed using this electrode 10 for electrochemical capacitor, the electrolyte solution becomes difficult to infiltrate into the porous body layer 18, resulting in decrease in the area of double layer interface and difficulty in attaining excellent volume capacitance.

From the standpoint to attain further excellent volume capacitance, the apparent density of the porous body layer 18 is preferably in a range from 0.64 to 0.69 g/cm$^3$, and more preferably from 0.65 to 0.68 g/cm$^3$.

The porous particles contained in the porous body layer 18 are not specifically limited if only they have electronic conductivity contributing to electric charge and discharge.

An example of the applicable porous particles is granular or fibrous activated carbon having been subjected to activation treatment. That type of activated carbon includes phenol-based activated carbon and coconut-shell activated carbon.

Average size of the porous particles is preferably in a range from 3 to 20 μm. The BET specific surface area determined from the nitrogen-absorption isotherm using the BET absorption isotherm equation is preferably 1500 m$^2$/g or more, and more preferably in a range from 2000 to 2500 m$^2$/g. That type of porous particles likely provides the electrode 10 for electrochemical capacitor having a more excellent volume capacitance.

The binder contained in the porous body layer 18 is not specifically limited if only it is able to bind the porous particles with each other. Examples of applicable binder are polytetrafluoroethylene (PTFE), polyvinylidene fluoride (PVDF), polyethylene (PE), polypropylene (PP), and fluororubber. Among them, fluororubber is preferred as the binder contained in the porous body layer 18. That type of binders likely binds sufficiently the porous particles together even with a small amount. The binder increases the coating film strength of the porous body layer 18 and increases the area of double layer interface to likely increase the volume capacitance.

Examples of applicable fluororubber are vinylidenefluoride-hexafluoropropylene-based fluororubber (VDF-HFP-based fluororubber), vinylidenefluoride-hexafluoropropylene-tetrafluoroethylene-based fluororubber (VDF-HFP-TFE-based fluororubber), vinylidenefluoride-pentafluoropropylene-based fluororubber (VDF-PFP-based fluororubber), vinylidenefluoride-pentafluoropropylene-tetrafluoroethylene-based fluororubber (VDF-PFP-TFE-based fluororubber), vinylidenefluoride-perfluoromethylvinylether-tetrafluoroethylene-based fluororubber (VDF-PFMVE-TFE-based fluororubber), vinylidenefluoride-chlorotrifluoroethylene-based fluororubber (VDF-CTFE-based fluororubber). Among them, a fluororubber prepared by copolymerization of at least two kinds selected from the group consisting of VDF, HFP and TFE is preferred, and a VDF-HFP-TFE-based fluororubber prepared by copolymerization of above three kinds is more preferable because the VDF-HFP-TFE-based fluororubber likely further increases the adhesiveness and the resistance to chemicals.

The conductive assistant added to the porous body layer 18, according to need, is not specifically limited if only it has electronic conductivity to sufficiently enhance the charge migration between the collector 16 and the porous body layer 18. Carbon black is an example of the conductive assistant.

Examples of the carbon black are acetylene black, Katchen black, and furnace black. In the embodiment, acetylene black is preferably used.

Average particle size of the carbon black is preferably in a range from 25 to 50 nm, and the BET specific surface area thereof is preferably 50 m$^2$/g or more, and more preferably from 50 to 140 m$^2$/g.

Thickness of the porous body layer 18 containing these components is preferably in a range from 50 to 200 μm, and more preferably from 80 to 150 μm, to reduce the size and weight of the electrode 10 for electrochemical capacitor. If the thickness of the porous body layer 18 is not uniform, (for example, when the surface has an irregular profile pattern as described later), the above-described thickness means the maximum film thickness. With that range of the thickness of porous body layer 18, the size and the weight of the electrochemical capacitor can be decreased.

Void volume of the porous body layer 18 is preferably in a range from 50 to 80 μL. With that void volume in the porous body layer 18, the electrode 10 for electrochemical capacitor assures satisfactory area of contact interface to the electrolyte solution. The term "void volume" referred to herein expresses the total micropore volume in the porous body layer 18. If, however, voids or fine cracks formed between the particles which structure the porous body layer 18 exist, the void volume is the value calculated by including also the volume of these voids and cracks. The void volume can be determined by a known method such as the ethanol-impregnation method or the like.

Furthermore, the porous body layer 18 preferably has an irregular profile pattern on the surface F2 formed by using the manufacturing method which is described later. The formed irregular profile pattern more preferably has the distance between peak and valley giving 50% or more of the maximum film thickness of the porous body layer.

With that type of irregular profile pattern on the surface F2 of the porous body layer 18, the specific surface area of the porous body layer 18 increases, thus attaining further excellent volume capacitance and reduced internal resistance.

The total thickness (maximum film thickness) of electrode 10 for electrochemical capacitor fabricated by laminating the collector 16 and the porous body layer 18 is preferably in a range from 70 to 250 μm, and more preferably from 100 to 180 μm. With that thickness, the reduction in size and weight of the electrochemical capacitor is attained.

The electrode 10 for electrochemical capacitor as described above, having the structure of the porous body layer 18 formed on the collector 16, is fabricated by the method described below. That is, the electrode 10 for electrochemical capacitor is fabricated by a method comprising the steps of: preparing a coating liquor for forming a porous body layer containing porous particles, a binder, and a liquid which is able to dissolve or to disperse the binder therein, so that the content of the porous particles in the coating liquor falls within 88 to 92% by mass on the basis of the total amount of solid matter in the coating liquor; forming the porous body layer by applying the coating liquor for forming the porous body layer onto the surface of the collector 16, followed by removing the liquid to form the porous body layer 18; and pressing the collector 16 and the porous body layer 18 together so that the apparent density of the porous body layer 18 falls within 0.62 to 0.70 g/cm$^3$.

Figure 2:
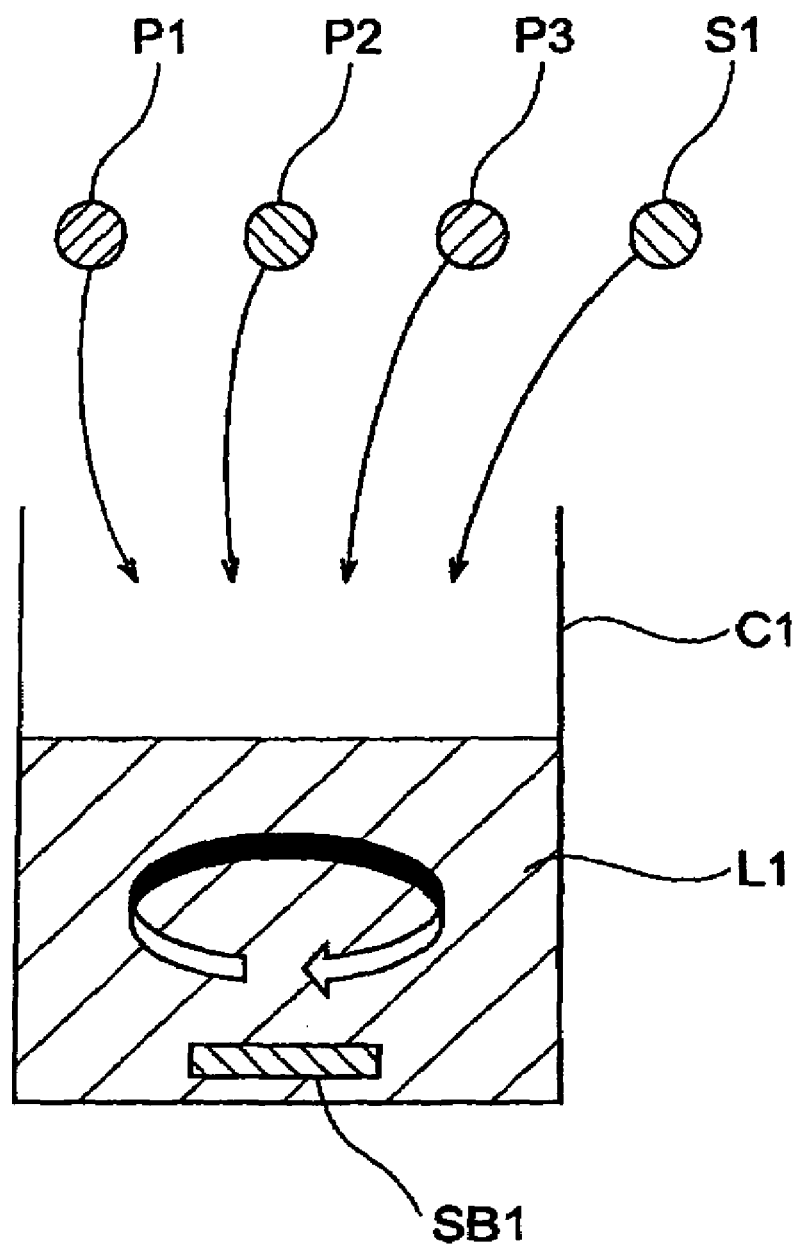
FIG. 2 is a view illustrating the process for preparing a coating liquor for forming the porous body layer.

The coating liquor L1 for forming the porous body layer is prepared by, as shown in FIG. 2 for example, charging the porous particles P1, the binder P2, the liquid S1, and, according to need, the conductive assistant P3 to the vessel C1 which contains a stirrer SB1, then by agitating the mixture (the step of preparing the coating liquor). Although the time and the temperature of agitation are not specifically limited, it is preferable that the agitation time is approximately from 1 to 5 hours, and the agitation temperature is approximately from 20° C. to 50° C. in view of attaining uniform dispersion of these components.

The liquid S1 is not specifically limited if only it dissolves the binder P2. An example of applicable liquid S1 is ketone-based solvent such as methylethylketone (MEK) and methylisobutylketone (MIBK).

Regarding the content of porous particles P1 in the coating liquor L1 for forming porous body layer, the content of porous particles P1 in the porous body layer 18 after forming the porous body layer 18 is required to fall within the above-described values. That is, on the basis of the total amount of solid matter excluding the liquid S1 in the coating liquor L1 for forming the porous body layer (total amount of the porous body layer 18), the content of the porous particles P1 is required to fall within 88 to 92% by mass as described above. Similarly, the content of binder P2 is preferably in a range from 6.5 to 12% by mass on the basis of the total amount of solid matter in the coating liquor L1 for forming porous body layer. Furthermore, the solid matter in the coating liquor L1 for forming porous body layer preferably contains from 88 to 92% of porous particles P1 by mass, 6.5 to 12% of binder P2 by mass, and 0 to 15% of conductive assistant P3 by mass, on the basis of the total amount of the solid matter.

Regarding the solid matter, more preferable ranges of the content of the respective components are the following. The content of porous particles P1 is more preferably from 89 to 91% by mass, and particularly preferably from 89.5 to 90.5% by mass. The content of binder P2 is more preferably from 8 to 10% by mass, and particularly preferably from 8.5 to 9.5% by mass. The content of conductive assistant P3 is more preferably from 0.5 to 1.5% by mass, and particularly preferably from 0.5 to 1.0% by mass.

The blending quantity of liquid S1 in the coating liquor L1 for forming porous body layer is preferably in a range from 200 to 400 parts by mass to 100 parts by mass of the total amount of solid matter in the coating liquor L1 for forming porous body layer.

The porous body layer 18 is formed by applying the coating liquor L1 for forming porous body layer onto the surface of the collector 16, followed by removing the liquid S1 (the step of forming the porous body layer). Then, the collector 16 and the porous body layer 18 are pressed together so that the apparent density of the porous body layer 18 falls within 0.62 to 0.70 g/cm$^3$ (the step of pressing) to obtain the electrode 10 for electrochemical capacitor.

Applicable method for applying the coating liquor L1 for forming porous body layer onto the surface of the collector 16 includes conventionally publicly known coating methods without specific limitation. Examples of the coating method are an extrusion-lamination method, doctor-blade method, gravure-coat method, reverse-coat method, applicator-coat method, and screen-printing method. Among these methods, adopting the extrusion-lamination method is preferred in the present invention because the method can apply the coating liquor in a state of highly dispersed components to give a thinner and uniform coating film thickness. The following description is for the method for manufacturing the electrode 10 for electrochemical capacitor using the extrusion-lamination coating method.

Figure 3:
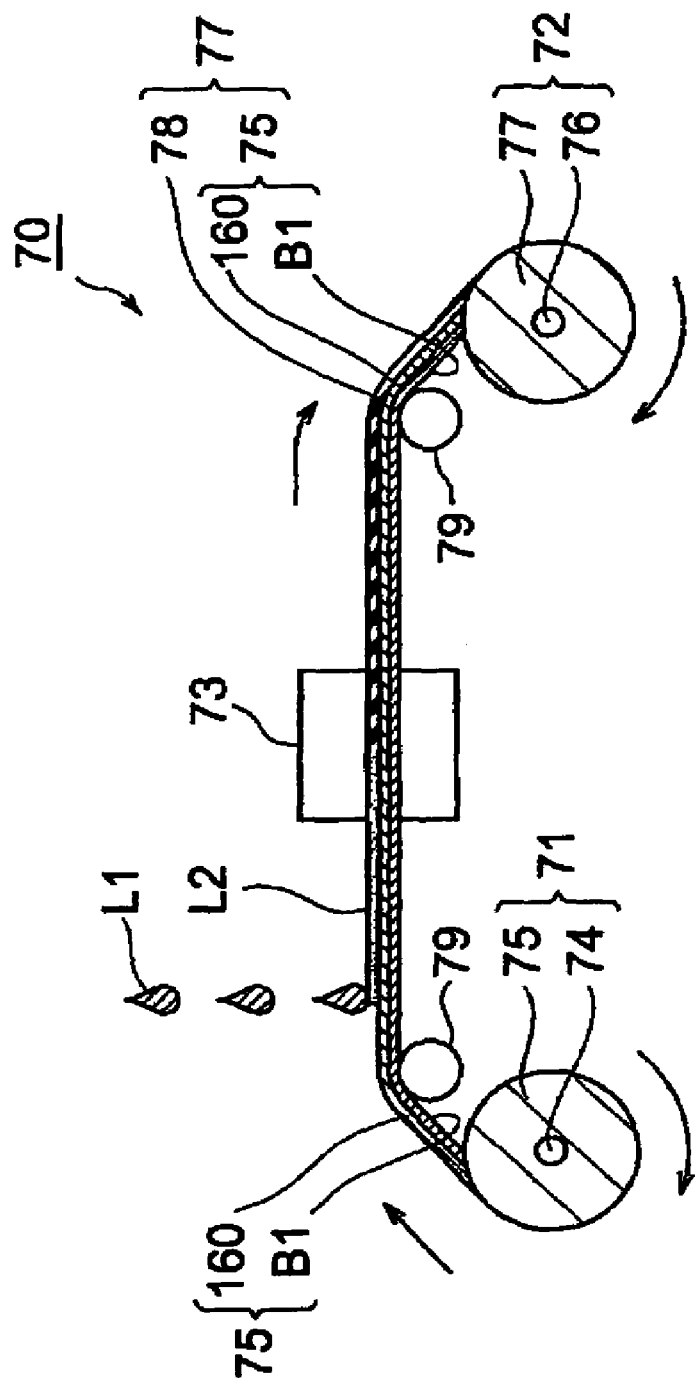
FIG. 3 is a view illustrating the step of forming an electrode sheet using the coating liquor for forming the porous body layer.
Figure 4:
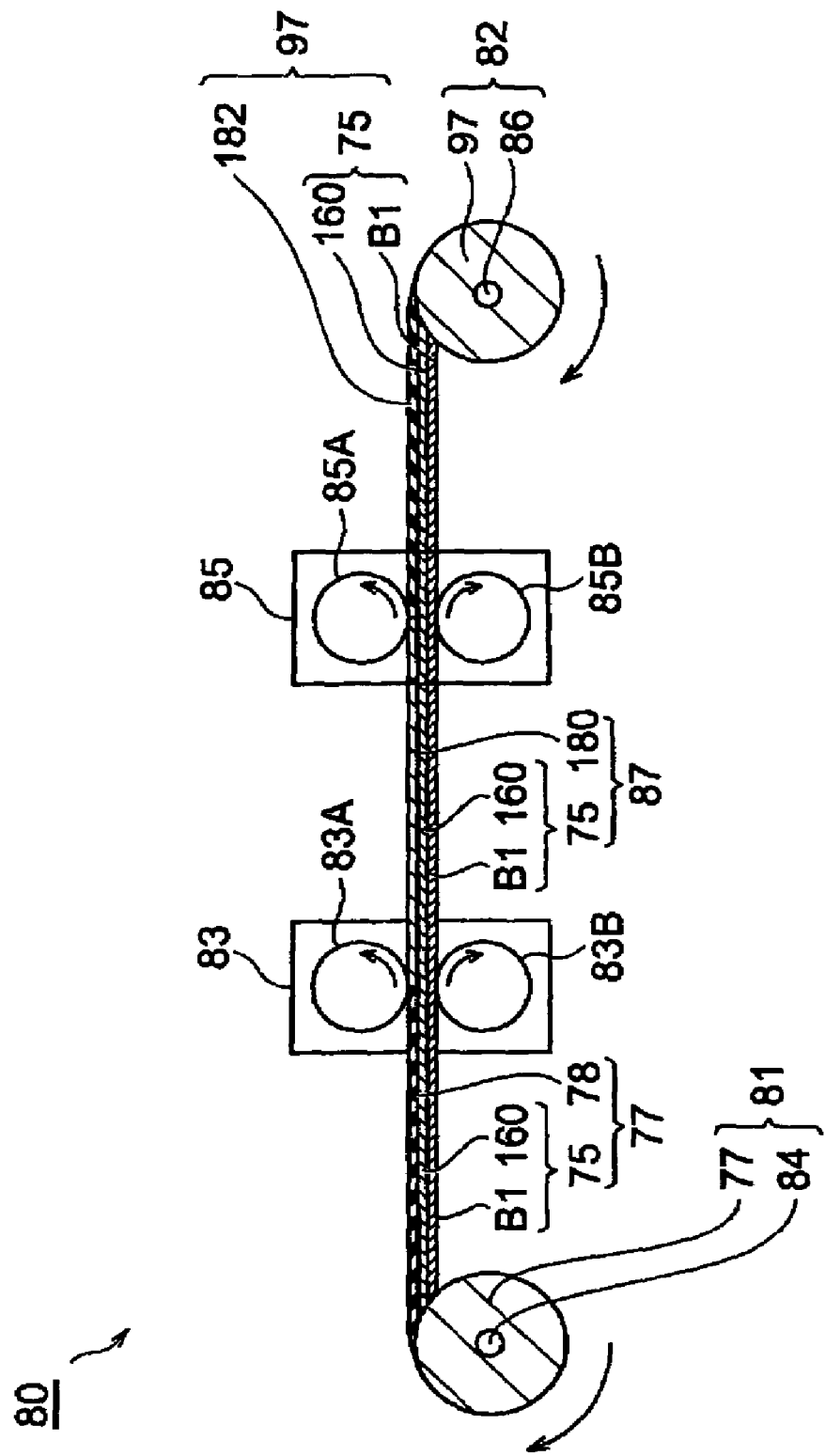
FIG. 4 is a view illustrating the step of forming an electrode sheet using the coating liquor for forming the porous body layer.

The electrode 10 for electrochemical capacitor is formed in sheet shape using an apparatus 70 and an apparatus 80 shown in FIGS. 3 and 4, respectively.

The apparatus 70 shown in FIG. 3 mainly comprises a first roll 71, a second roll 72, a drier 73 positioned between the first roll 71 and the second roll 72, and two support rolls 79. The first roll 71 is structured by a cylindrical core 74 and a first laminate sheet 75 in tape shape. An end of the first laminate sheet 75 is connected to the core 74. The first laminate sheet 75 is wound around the core 74. The first laminate sheet 75 has a structure of lamination of a metallic foil sheet 160 (the sheet to become the collector 16 in the electrode 10) over a substrate sheet B1.

The second roll 72 has a cylindrical core 76 to which another end of the first laminate sheet 75 is connected. To the core 76 of the second roll 72, a core-drive motor (not shown) is connected to rotate the core 76. With the configuration, the second laminate sheet 77, which is obtained by applying the coating liquor L1 for forming porous body layer onto the metallic foil sheet 160 of the first laminate sheet 75 and further subjecting the same to drying treatment in the drier 73, is coiled at a specified speed.

First, the rotation of the core-drive motor makes the core 76 of the second roll 72 rotate, thus the first laminate sheet 75 wound around the core 74 of the first roll 71 is drawn out from the first roll 71. Then, the coating liquor L1 for forming porous body layer is applied onto the metallic foil sheet 160 of the drawn first laminate sheet 75, thus forming the coating film L2 made of the coating liquor L1 for forming porous body layer on the metallic foil sheet 160.

Next, the rotation of the core-drive motor guides the first laminate sheet 75 with the formed coating film L2 to the drier 73 using the support roll 79. The coating film L2 on the first laminate sheet 75 is dried in the drier 73 to remove the liquid S1 from the coating film L2, thus forming a layer 78, which is to become a precursor of the porous body layer 18 after fabricated to the electrode (hereinafter referred to as the "precursor layer 78"). The drying condition of coating film L2 in the drier 73 is not specifically limited as far as the drying is done under a condition to fully remove the liquid S1 from the coating film L2. The drying is preferably given under a condition of 70° C. to 130° C. and 0.1 to 3 minutes.

The rotation of the core-drive motor guides the second laminate sheet 77 which is prepared by forming the precursor layer 78 on the first laminate sheet 75 to the core 76 by the support roll 79 to be wound around the core 76.

Next, the apparatus 80 shown in FIG. 4 is used to prepare an electrode sheet ES10 from the second laminate sheet 77.

The apparatus 80 shown in FIG. 4 mainly comprises a first roll 81, a second roll 82, and two roll presses 83 and 85 positioned between the first roll 81 and the second roll 82. The first roll 81 is structured by a cylindrical core 84 and the second laminate sheet 77 in tape shape as described above. An end of the second laminate sheet 77 is connected to the core 84. The second laminate sheet 77 is wound around the core 84. The second laminate sheet 77 has a structure of further lamination of the precursor layer 78 on the first laminate sheet 75 which is prepared by laminating the metallic foil sheet 160 over the substrate sheet B1.

The second roll 82 has a cylindrical core 86 to which another end of the second laminate sheet 77 is connected. To the core 86 of the second roll 82, a core-drive motor (not shown) is connected to rotate the core 86. With the configuration, a fourth laminate sheet 97 which is prepared by conducting press-treatment using the roll press 83 and the roll press 85 is wound at a specified speed.

First, the core-drive motor rotates to rotate the core 86 of the second roll 82, thus the second laminate sheet 77 wound around the core 84 of the first roll 81 is drawn out from the first roll 81, and is introduced to the roll press 83. The roll press 83 is equipped with two cylindrical rollers 83A and 83B. The rollers 83A and 83B are arranged to allow the second laminate sheet 77 to be inserted therebetween and positioned so as to establish a state, on inserting the second laminate sheet 77 in between these rollers 83A and 83B, in which the face of the roller 83A and the outer surface of the precursor layer 78 of the second laminate sheet 77 touch with each other and the face of the roller 83B and the outer surface (rear face) of the substrate sheet B1 of the second laminate sheet 77 touch with each other, while pressing the second laminate sheet 77 at a specified temperature and pressure. The cylindrical rollers 83A and 83B have respective rotational mechanisms to rotate in a direction according to the moving direction of the second laminate sheet 77. Furthermore, the cylindrical rollers 83A and 83B have lengths between two bottom faces (length normal to the surface of view of FIG. 4) which are larger than the width of the second laminate sheet 77 respectively. In the roll press 83, the precursor layer 78 on the second laminate sheet 77 is subjected to heating and pressurizing treatment, according to need, to become the porous body layer 180.

The third laminate sheet 87 prepared by applying press-treatment to the second laminate sheet 77 in the roll press 83 is introduced to another roll press 85 by rotation of the second roll 82. The roll press 85 is equipped with two cylindrical rollers 85A and 85B. The rollers 85A and 85B are arranged to allow the third laminate sheet 87 to insert therebetween and positioned so as to establish a state, on inserting the third laminate sheet 87 in between these rollers 85A and 85B, in which the face of the roller 85A and the outer surface of the porous body layer 180 of the third laminate sheet 87 touch with each other and the face of the roller 85B and the outer surface (rear face) of the substrate sheet B1 of the third laminate sheet 87 touch with each other, while pressing the third laminate sheet 87 at a specified temperature and pressure. The cylindrical rollers 85A and 85B have respective rotational mechanisms to rotate in a direction according to the moving direction of the third laminate sheet 87. Furthermore, the cylindrical rollers 85A and 85B have lengths between two bottom faces (length normal to the surface of view of FIG. 4) which are larger than the width of the third laminate sheet 87 respectively.

The third laminate sheet 87 which was subjected to press-treatment by the roll press 85 forms a porous body layer 182 to become the fourth laminate sheet 97, which is wound around the core 86 by rotation of the core-drive motor.

Figure 5:
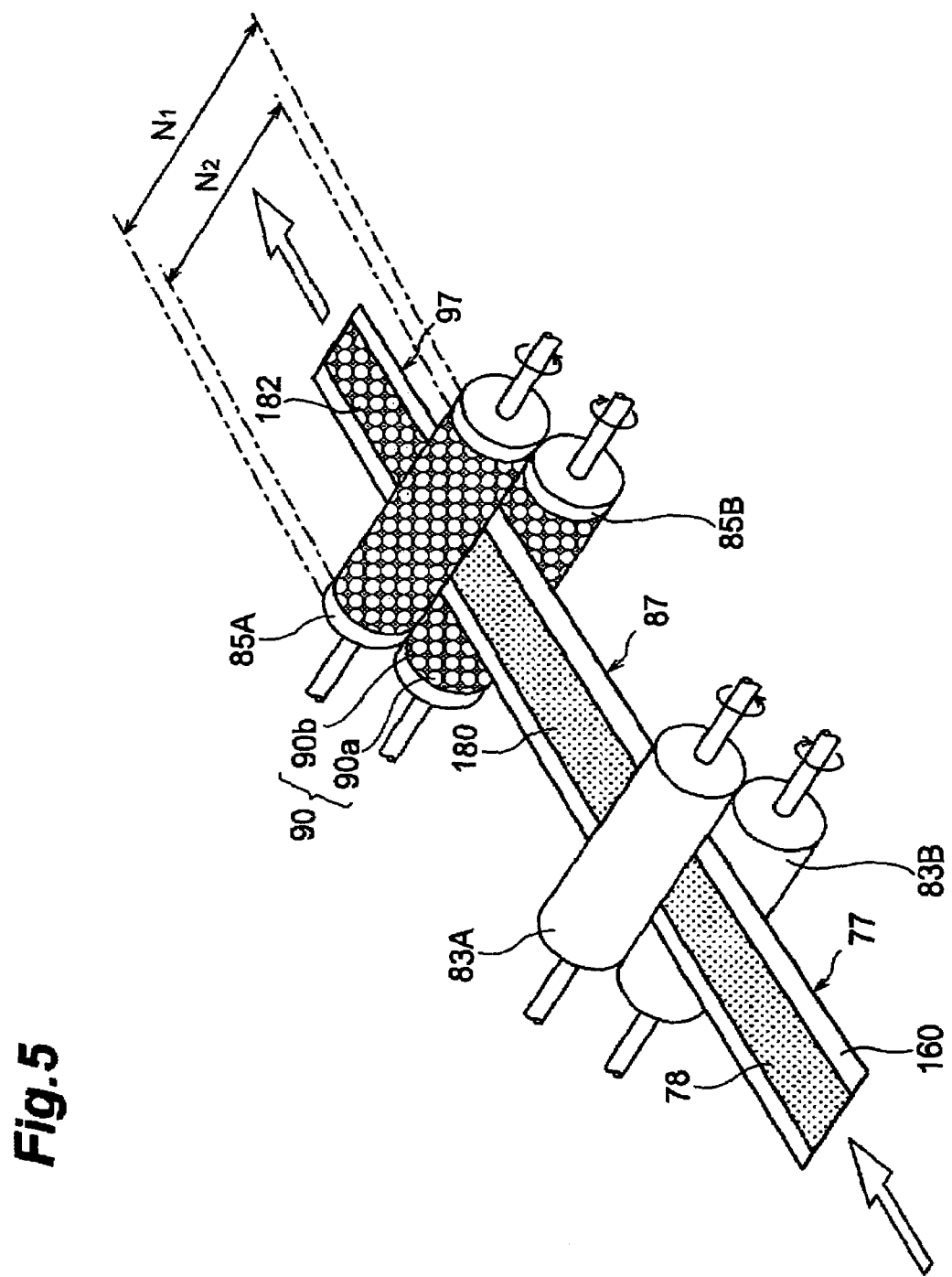
FIG. 5 is a schematic view illustrating the step of press-treatment for a laminate sheet using rollers.

FIG. 5 is a schematic view illustrating the step of press-treatment for the second laminate sheet 77 and the third laminate sheet 87 using the rollers 83A and 83B and the rollers 85A and 85B, respectively. As seen in FIG. 5, the portions of outer surface of the rollers 85A and 85B contacting with the third laminate sheet 87 have respective irregular profile pattern sections 90. The irregular profile pattern section 90 has a plurality of concavities 90a and convexes 90b. The convexes 90b are formed in plurality number in regular arrangement. The length $N_1$ of that type of rollers 85A and 85B is, for example, approximately 160 mm, while the length $N_2$ of the irregular profile pattern section 90 is fabricated to be, for example, about 100 mm.

Figure 6:
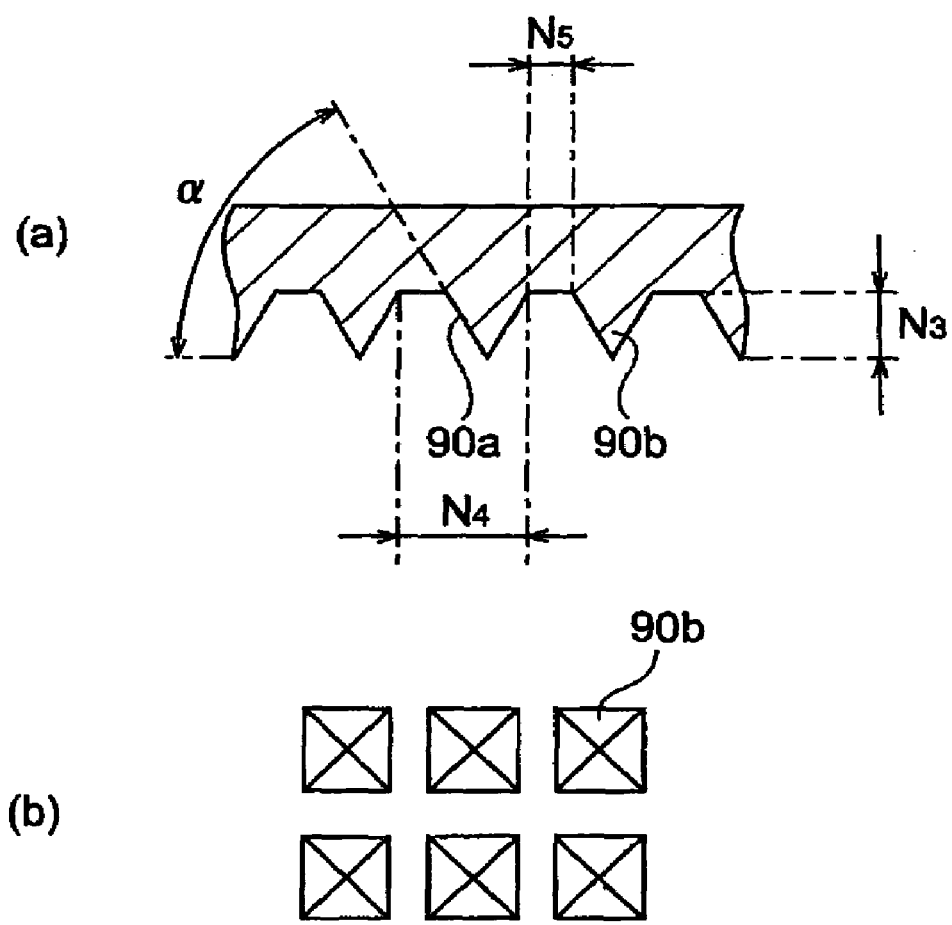
FIG. 6 is a view showing an example of concavity and convex of an irregular profile pattern on roller.

FIG. 6 shows an example of concavity 90a and convex 90b in that type of irregular profile pattern section 90. FIG. 6 is a view of an example of concavity and convex of the irregular profile pattern section on roller. In FIG. 6, (a) is a schematic view of cross sectional view of the concavities 90a and the convexes 90b, and (b) is a plan view of the concavities 90a and the convexes 90b in (a). As shown in FIG. 6, the convex 90b has conical shape, and a plurality of convexes 90b are arranged in regular pattern at an equal spacing. Each of the concavities 90a is positioned between the convexes 90b.

Figure 7:
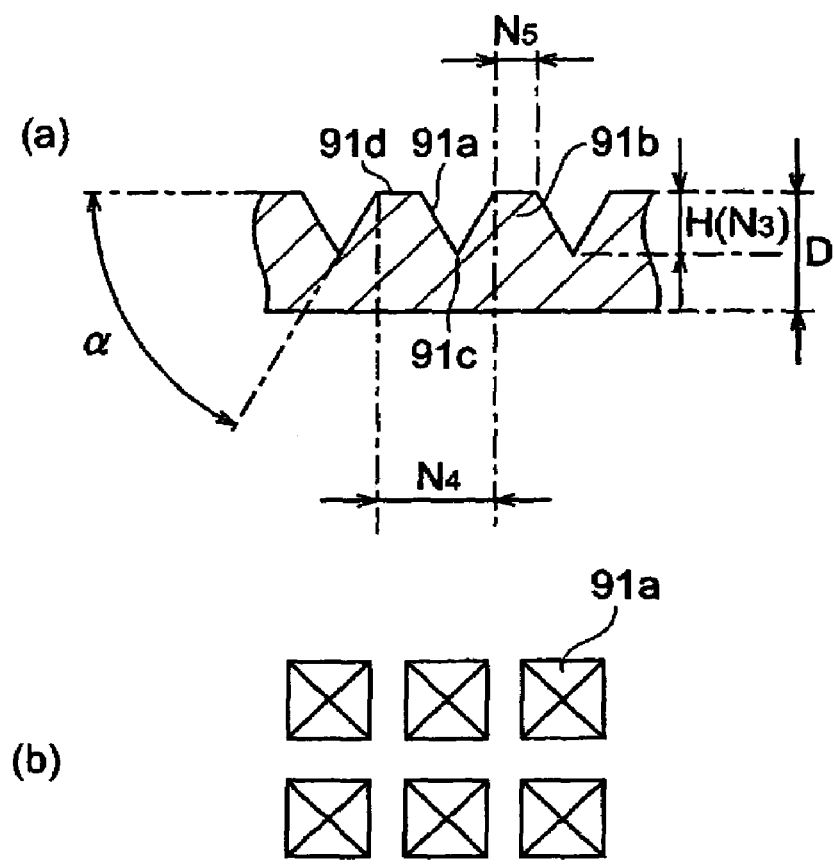
FIG. 7 is a view showing an example of concavity and convex of an irregular profile pattern on the porous body layer.

FIG. 7 is a view showing an example of surface of the porous body layer 182 having an irregular profile pattern. In FIG. 7, (a) is a schematic view of cross sectional view of concavities 91a and convexes 91b, and (b) is a plan view of the concavities 91a and the convexes 91b in (a). As shown in (a) of FIG. 7, the porous body layer 182 has an irregular profile pattern which has a valley 91c and a peak 91d, and which is a pattern structured by the concavities 91a which are the transcription of the convexes 90b in FIG. 6 and by the convexes 91b which are the transcription of the concavities 90a in FIG. 6.

The third laminate sheet 87 which was subjected to press-treatment in the roll press 83 is introduced to the roll press 85, and is inserted in between the roller 85A and the roller 85B for pressing. With the press-treatment, concavities and convexes are formed on the surface of the porous body layer 180 of the third laminate sheet 87 by the transcription of convexes 90b and concavities 90a of the irregular profile pattern section 90 on the roller 85A, respectively, thus becoming the porous body layer 182 (the porous body layer 18 for the case of electrode 10 for electrochemical capacitor.)

Figure 8:
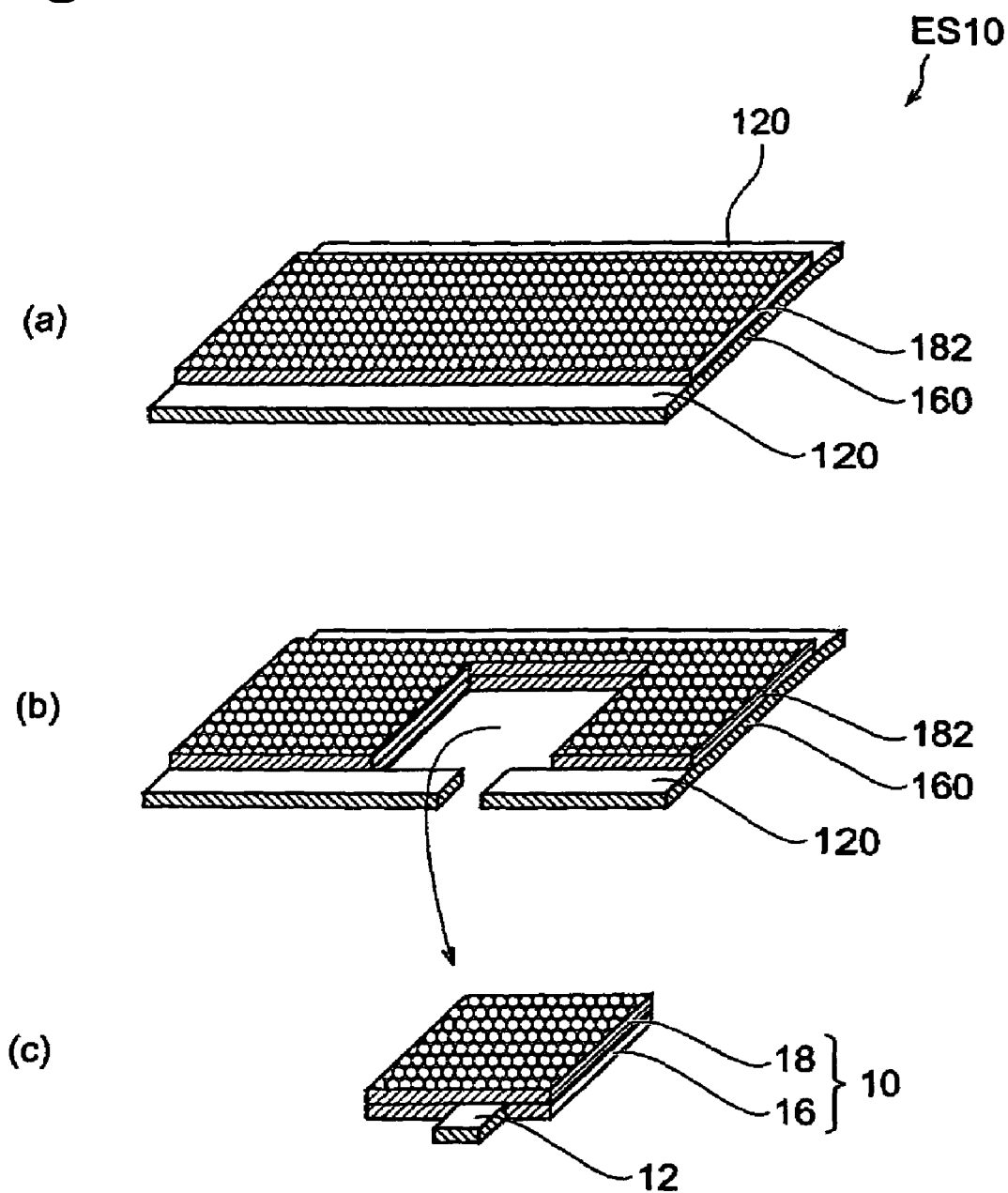
FIG. 8 is a view illustrating the step of fabricating an electrode from an electrode sheet.

Then, as shown in (a) in FIG. 8, the laminate sheet 87 wound around the core 86 is cut to a specified size to prepare the electrode sheet ES10. For the case of electrode sheet ES10 shown in (a) in FIG. 8, an edge section 120 is formed, which edge section 120 gives exposed surface of the metallic foil sheet 160. On applying the coating liquor L1 for forming electrode onto the metallic foil sheet 160 of the first laminate sheet 75, the edge section 120 can be formed by adjusting the application of the coating liquor L1 for forming electrode only to the center portion of the metallic foil sheet 160.

Next, as shown in (b) in FIG. 8, the electrode sheet ES10 is punched to a size corresponding to the scale of electrochemical capacitor to be fabricated to give the electrode 10 for electrochemical capacitor shown in (c) in FIG. 8. Thus the porous body layer 182 becomes the porous body layer 18, and the metallic foil sheet 160 becomes the collector 16. In this step, when the electrode sheet ES10 is prepared by punching so as the edge section 120 to be left as a lead 12, the electrode 10 for electrochemical capacitor in a state of integrating the lead 12 in advance is obtained. If the lead 12 is not joined, the lead 12 is prepared separately to electrically connect with the electrode 10 for electrochemical capacitor.

Since the electrode 10 for electrochemical capacitor, fabricated by the above-described procedure, has concavities 91a and convexes 91b formed by the transcription of the irregular profile pattern section 90 on the surface of the porous body layer 182, the specific surface area of the porous body layer 182 increases to attain further excellent volume capacitance. Furthermore, with thus formed irregular profile pattern, the internal resistance of the electrode 10 for electrochemical capacitor also decreases.

(Electrochemical capacitor and method for manufacturing same) The electrochemical capacitor according to the present invention has the first electrode and the second electrode facing each other as the anode and the cathode, respectively. At least one of the anode and the cathode, (preferably both of them), is the electrode 10 for electrochemical capacitor according to the present invention. The following is specific description of a preferred embodiment of the electrochemical capacitor according to the present invention with an example where both of anode and cathode are the electrodes 10 for electrochemical capacitor. The electrode 10 for electrochemical capacitor given in FIG. 1 is used as the anode 10 in the following electrochemical capacitor according to the present invention.

Figure 9:
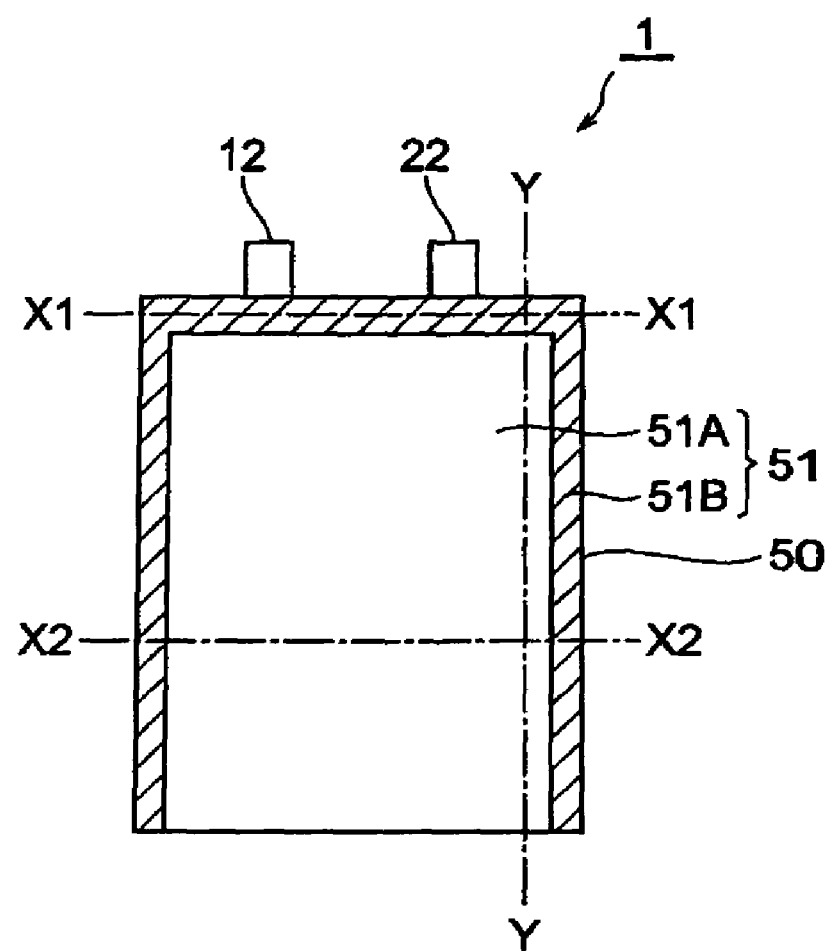
FIG. 9 is a front view of a preferred embodiment of the electrochemical capacitor according to the present invention.
Figure 10:
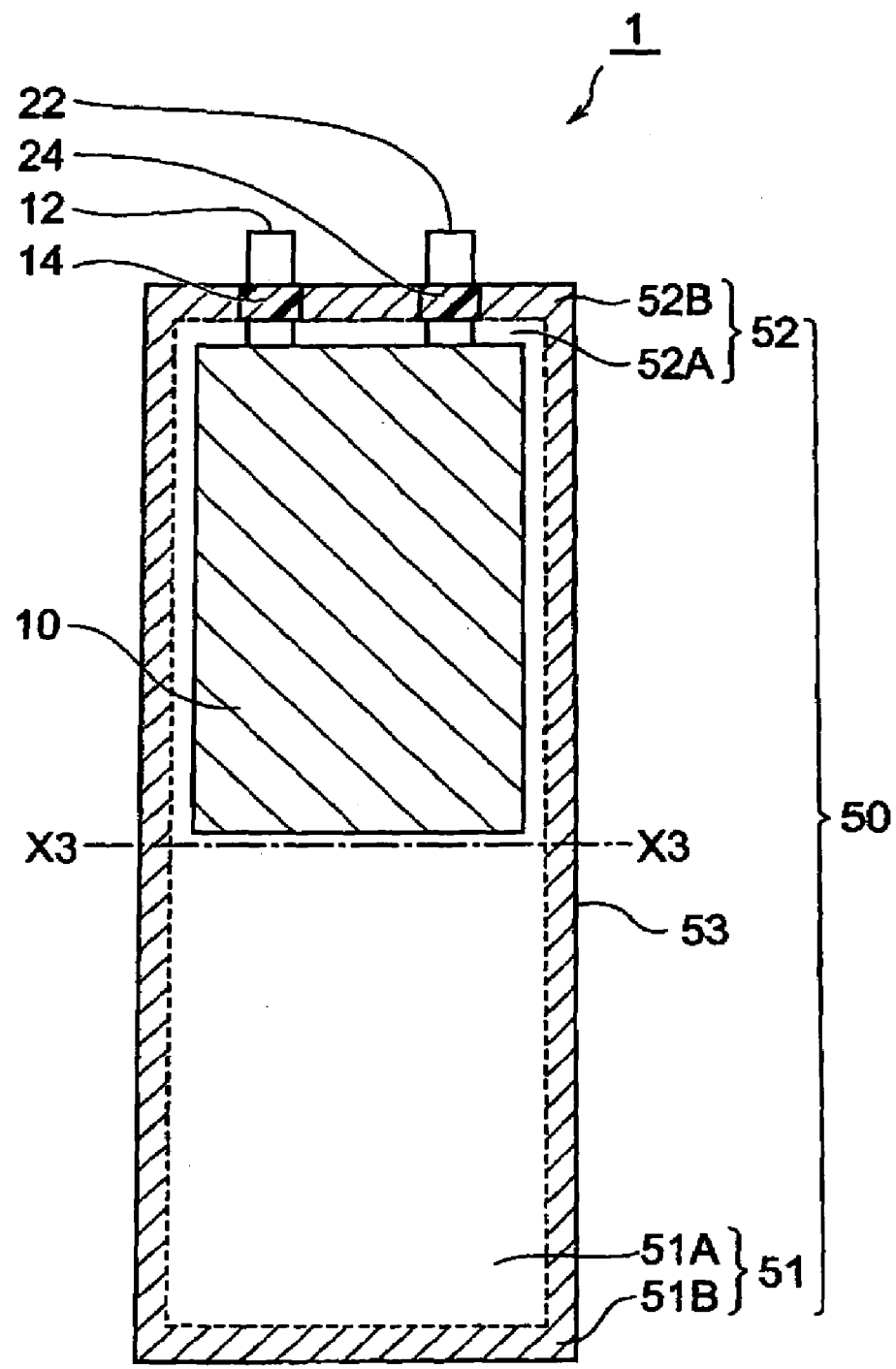
FIG. 10 is a development view of internal structure of the electrochemical capacitor given in FIG. 9, viewed in the normal direction to the surface of anode 10.
Figure 11:
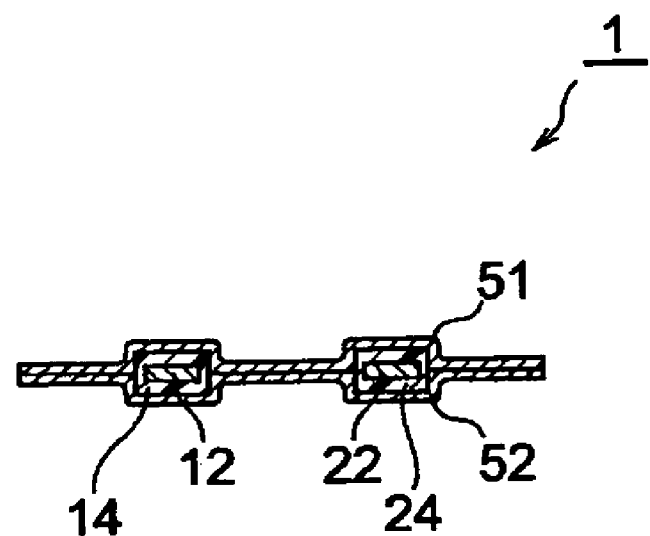
FIG. 11 is a schematic cross sectional view of the electrochemical capacitor given in FIG. 9, cut along X1—X1 in FIG. 9.
Figure 12:
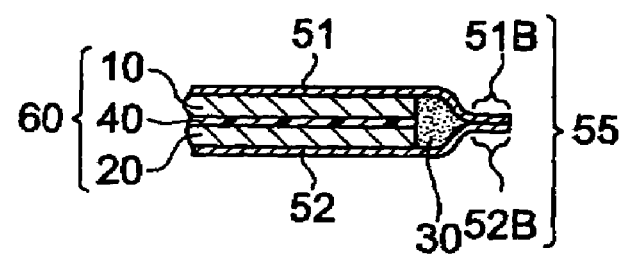
FIG. 12 is a schematic cross sectional view of main part of the electrochemical capacitor given in FIG. 9, cut along X2—X2 in FIG. 9.
Figure 13:
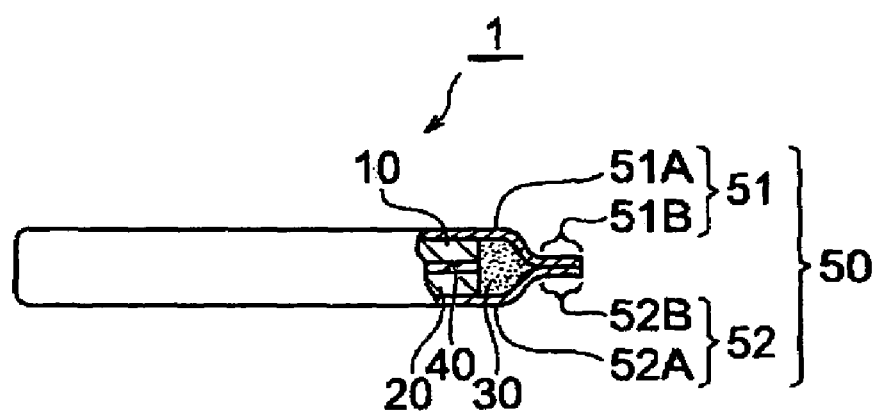
FIG. 13 is a schematic cross sectional view of main part of the electrochemical capacitor given in FIG. 9, cut along Y—Y in FIG. 9.
Figure 14:
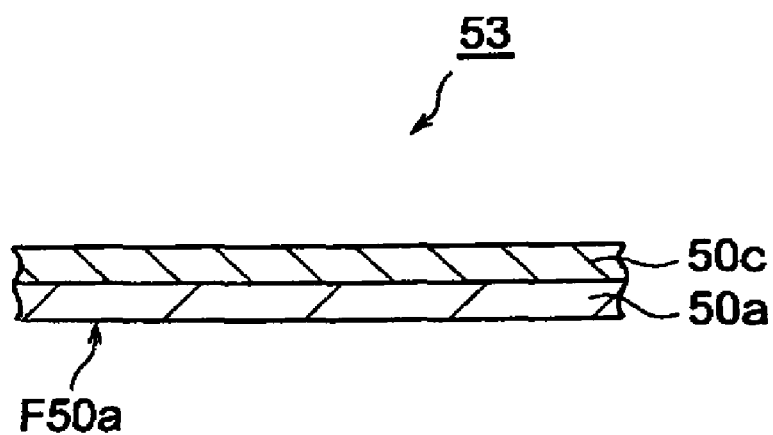
FIG. 14 is a schematic cross sectional view giving an example of basic structure of a film which is a material to structure the casing of the electrochemical capacitor given in FIG. 9.

FIG. 9 shows the front view of a preferred embodiment of the electrochemical capacitor according to the present invention (electric double layer capacitor). FIG. 10 shows the development of internal structure of the electrochemical capacitor given in FIG. 9, viewed in the normal direction to the surface of anode 10. FIG. 11 is a schematic cross sectional view of the electrochemical capacitor given in FIG. 9, cut along X1—X1 in FIG. 9. FIG. 12 is a schematic cross sectional view of main part of the electrochemical capacitor given in FIG. 9, cut along X2—X2 in FIG. 9. FIG. 13 is a schematic cross sectional view of main part of the electrochemical capacitor given in FIG. 9, cut along Y—Y in FIG. 9.

As shown in FIGS. 9 through 13, the electrochemical capacitor 1 mainly comprises the anode 10 (the first electrode) in flat shape, the cathode 20 (the second electrode) in flat shape facing the anode 10, the separator 40 in flat shape placed between the anode 10 and the cathode 20, the electrolyte solution 30, and the casing 50 which contains the anode 10, the cathode 20, the separator 40, and the electrolyte solution 30, in sealed state. The electrochemical capacitor 1 further contains the anode lead 12 which is electrically connected to the anode 10 at an end thereof while projecting outward from the casing 50 at another end thereof, and the cathode lead 22 which electrically connects with the cathode 20 at an end thereof while projecting outward from the casing 50 at another end thereof. The "anode" 10 and the "cathode" 20 are determined herein based on the polarity during discharge of the electrochemical capacitor 1, for convenience of explanation. FIG. 12 shows an element body 60 made of a laminate prepared by stacking the anode 10, the separator 40, and the cathode 20 in this order.

The electrochemical capacitor 1 has the structure described below. The detail of each component in the embodiment is described below referring to FIG. 1 and FIGS. 9 through 16.

The casing 50 has the first film 51 and the second film 52, facing each other. As shown in FIG. 10, the first film 51 and the second film 52 in the embodiment are connected with each other. That is, the casing 50 according to the embodiment is formed by folding a rectangular film made of a sheet of composite packaging film along the folding line X3—X3 in FIG. 10 and by overlaying a pair of edge sections of the rectangular film facing each other (the edge section 51B of the first film 51 and the edge section 52B of the second film, shown in the figure), to apply adhesive or to give heat-sealing.

The first film 51 and the second film 52 designate the respective sections of these films having faces facing each other resulted from folding a single sheet of rectangular film as described above. In the specification, the section obtained by joining the respective edge sections 51B and 52B on the first film 51 and the second film 52 is called the "seal section".

With the procedure, there arises no need to prepare the edge section for joining the first film 51 and the second film 52 together at the section of folding line X3—X3, thus the area of seal section in the casing 50 can further be decreased. As a result, the volume energy density based on the volume of space to install the electrochemical capacitor 1 can further be improved. The term "volume energy density" referred to herein is inherently defined by the percentage of total output energy to the total volume including the container of electrochemical capacitor. On the other hand, the term "the volume energy density based on the volume of space to install the electrochemical capacitor" signifies the percentage of total output energy of the electrochemical capacitor to the apparent volume determined on the basis of the maximum height, maximum width, and maximum thickness of the electrochemical capacitor. For actually mounting the electrochemical capacitor to a small electronics equipment, it is important to increase the inherent volume energy density and also to increase the volume energy density based on the volume of space to install the electrochemical capacitor, as described above, in view of efficient use of the limited space in the small electronics equipment in a sate of fully reduced dead space.

As for the electrochemical capacitor 1 in the embodiment, an end of each of the anode lead 12 and the cathode lead 22, connecting with the anode 10, is disposed so as to project outward from the seal section 55 which joins the edge section 51B of the first film 51 with the edge section 52B of the second film 52, as illustrated in FIGS. 9 and 10.

The film which structures the first film 51 and the second film 52 is preferably a flexible film. Since the film is light weight and readily reduces the thickness, the electrochemical capacitor itself can be formed in thin shape. As a result, the inherent volume energy density is readily increased, and the volume energy density on the basis of the volume of space for installing the electrochemical capacitor can be readily increased.

The film is preferably a flexible film. The film is preferably a "composite packaging film" which contains at least an innermost layer made of a synthetic resin contacting with the electrolyte solution and a metallic layer which is positioned on the upper side the innermost layer, from the viewpoint of effectively preventing the invasion of moisture and air from outside to inside the casing and of effectively preventing the release of the electrolyte from inside to outside the casing, while securing sufficient mechanical strength and lightweight of the casing. An applicable composite packaging film as the first film 51 and the second film 52 is a composite packaging film having the structure, for example, shown in FIG. 14 or FIG. 15. The composite packaging film 53 shown in FIG. 14 has an innermost layer 50a made of a synthetic resin to contact with the electrolyte solution at the inner face F50a thereof, and a metallic layer 50c which is positioned on another face (outer face) of the innermost layer 50a. The composite packaging film 54 shown in FIG. 15 has a structure of further locating an outermost layer 50b made of a synthetic resin on the outer face (opposite to the layer 50a) of the metallic layer 50c of the composite packaging film 53 shown in FIG. 14.

The composite packaging film applicable to the first film 51 and the second film 52 is not specifically limited if only the film is a composite packaging material having two or more layers containing one or more layer made of synthetic resin including the above-described innermost layer and a metallic layer such as metallic foil. From the point of attaining further surely the effect similar to above-given one, it is more preferable that the composite packaging film is structured by three or more layers, similar to the composite packaging film 54 shown in FIG. 15, namely, the innermost layer, the outermost layer made of a synthetic resin positioned at the outer surface side of the casing 50, or at the outer surface most distant from the innermost layer, and at least one metallic layer positioned between the innermost layer and the outermost layer.

The innermost layer 50a is a flexible layer. The material of the innermost layer 50a is not specifically limited if only the material is a synthetic resin which is able to exert the above-described flexibility and which has chemical stability to the applied electrolyte solution (characteristic of not inducing chemical reaction, dissolution, and swelling), and has chemical stability to oxygen and water (moisture in air). It is, however, more preferable that the material has a characteristic of low permeability to oxygen, water (moisture in air), and components of electrolyte solution. Examples of applicable material are engineering plastics and thermoplastic resins such as polyethylene, polypropylene, acid-modified polyethylene, acid-modified polypropylene, polyethylene ionomer, and polypropylene ionomer.

The term "engineering plastics" referred to herein signifies the plastics having excellent dynamic characteristics, thermal resistance, and durability, used in mechanical parts, electric parts, housing materials, and the like. Examples of the engineering plastics are polyacetal, polyamide, polycarbonate, polyoxytetramethyleneoxy terephthaloyl (polybutylene terephthalate, polyethylene terephthalate), polyimide, and polyphenylenesulfide or the like.

Figure 15:
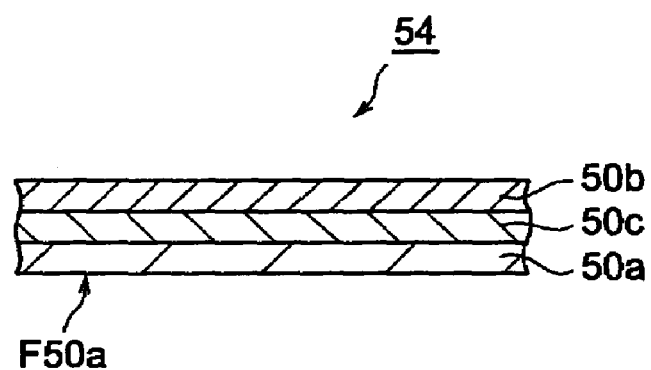
FIG. 15 is a schematic cross sectional view giving another example of basic structure of the film which is a material to structure the casing of the electrochemical capacitor given in FIG. 9.
Figure 16:
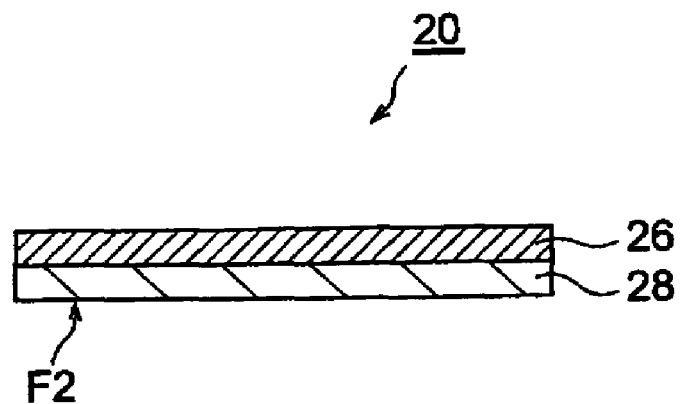
FIG. 16 is a schematic cross sectional view giving an example of basic structure of the cathode of the electrochemical capacitor given in FIG. 9.

For the case of the composite packaging film 54 shown in FIG. 15, which further has a synthetic resin layer such as the outermost layer 50b or the like other than the innermost layer 50a, the synthetic resin layer may also use similar material to that of the innermost layer 50a. The synthetic resin layer may use a layer made of engineering plastics such as polyethylene terephthalate (PET) and polyamide (nylon) or the like.

Although the seal method to form all the seal sections 55 on the casing 50 is not specifically limited, heat-seal method is preferred from the point of productivity.

The metallic layer 50c is preferably a layer made of a metallic material which has resistance to corrosion by oxygen, water (moisture in air), and electrolyte solution. Metallic foil of aluminum, aluminum alloy, titanium, chromium and the like may be used as the metallic layer 50c.

The following is the description of anode 10 and cathode 20. The anode 10 uses the electrode 10 for electrochemical capacitor shown in FIG. 1, as described before. The cathode 20 uses, as given in FIG. 16, an electrode having similar structure to that of the electrode 10 for electrochemical capacitor, as described before. The cathode 20 shown in FIG. 16 has a structure, similar to the anode 10, having the collector 26 and the porous body layer 28 formed on one surface of the collector 26. The symbol F2 in FIG. 16 designates the face contacting with the electrolyte solution.

The separator 40 positioned between the anode 10 and the cathode 20 is preferably made of an insulating porous body. Examples of the insulating porous body are a laminate of films of polyethylene, polypropylene or polyolefin, a stretched film of a mixture of these resins, and a nonwoven fabric made of at least one constituent material selected from the group consisting of cellulose, polyester and polypropylene.

The collector 28 of the cathode 20 is electrically connected to an end of the cathode lead 22 made of, for example, aluminum. Another end of the cathode lead 22 extends outside the casing 50. Also the collector 18 of the anode 10 is electrically connected with an end of the anode lead 12 made of, for example, copper or nickel. Another end of the anode lead 12 extends outside the casing 50.

The electrolyte solution 30 is filled in an inner space of the casing 50, and a part of it is preferably contained in the anode 10, the cathode 20, and the separator 40.

The electrolyte solution 30 is not specifically limited, and a publicly known electrolyte solution used in electrochemical capacitors such as an electric double layer capacitor (aqueous electrolyte solution, electrolyte solution using an organic solvent) may be used. When the electrochemical capacitor is an electric double layer capacitor, however, the use of an electrolyte solution using an organic solvent (non-aqueous electrolyte solution) is preferred because the aqueous electrolyte solution gives an electrochemically low decomposition voltage so that the withstand voltage of the capacitor is limited to a low level.

Although the kind of the electrolyte solution 30 is not specifically limited, generally the selection is given considering the solubility and degree of dissociation of solute, and liquid viscosity. An electrolyte solution having a high conductivity and high potential window (high decomposition-initiation voltage) is desirable. As a typical example, an electrolyte solution prepared by dissolving a quaternary ammonium salt such as tetraethylammonium tetrafluoroborate in an organic solvent such as propylene carbonate, diethylene carbonate or acetonitrile is used. In this case, the water content has to be strictly controlled.

As illustrated in FIGS. 9 and 10, the portion of the anode lead 12 contacting the seal section of the casing 50, which seal section is structured by the edge section 51B of the first film 51 and the edge section 52B of the second film, is covered by the insulator 14 to prevent the contact between the anode lead 12 and the metallic layer in the composite packaging film forming the respective films. Furthermore, the portion of the cathode lead 22 contacting the seal section 55 of the casing 50, which seal section is structured by the edge section 51B of the first film 51 and the edge section 52B of the second film, is covered by the insulator 24 to prevent the contact between the cathode lead 22 and the metallic layer in the composite packaging film forming the respective films.

The structure of the insulator 14 and the insulator 24 is not specifically limited. For example, each of these insulators 14 and 24 may be made of synthetic resin. If the contact of the metallic layer in the composite packaging film with the anode lead 12 and with the cathode lead 22 is fully prevented, these insulators 14 and 24 may be eliminated from the structure.

The following is the description of the method for manufacturing the above-given casing 50 and the electrochemical capacitor 1.

The method for preparing the element body 60 (a laminate prepared by stacking the anode 10, the separator 40, and the cathode 20, in this order) is not specifically limited, and publicly known thin-film forming technology adopted in the manufacture of electrochemical capacitors may be used.

For example, the anode 10 and the cathode 20 are prepared using the above-described method for manufacturing electrode for electrochemical capacitor, and the separator 40 is placed between the anode 10 and the cathode 20 in a state of contacting with each other (in non-adhesion state), thus completing the fabrication of the element body 60.

Next, an example of the method for preparing the casing 50 is described below. For the case that the first film and the second film are prepared using the above-described composite packaging film, a known manufacturing method such as a dry-lamination method, wet-lamination method, hot-melt lamination method or extrusion-lamination method is used.

For example, a film to become the synthetic resin layer, and a metallic foil made of aluminum or the like are prepared for structuring the composite packaging film. The metallic foil may be provided by rolling and processing a metallic material.

Next, the composite packaging film (multilayer film) is prepared by sticking the metallic foil to the film to become the synthetic resin layer via an adhesive to form, preferably, the above-described plurality layer structure. After that, the composite packaging film is cut to a specified size to provide a single sheet of film in rectangular shape.

As described before referring to FIG. 10, the single sheet of the film 53 is folded to position the element body 60.

For the contact section of the first film 51 and the second film 52 to be thermally fused, thermal fusion treatment is given to the section where the first lead and the second lead are positioned between the edge section 51B to be thermally fused on the first film 51 and the edge section 52B to be thermally fused on the second film 52. At this moment, it is preferable to apply the above-described adhesive onto the surface of the anode lead 12 to further surely attain the sufficient sealability of the casing 50. Thus, after the thermal fusion treatment, between the anode lead 12, and the first film 51 and the second film 52, the insulation layer 14 made of the adhesive to contribute to the adhesiveness between them is formed. Then, following the procedure similar to that described above, the thermal fusion treatment is given also to the section peripheral to the cathode lead 22 at the same time with or separately from the above-described thermal fusion treatment, thus capable of forming the casing 50 having satisfactory sealability.

Next, among the edge section 51B of the first film 51 and the edge section 52B of the second film, heat seal (thermal welding) is applied to the sections other than the above-described section peripheral to the anode lead 12 and the above-described section peripheral to the cathode lead 22, only by an intended seal width under a specific heating condition using, for example, a sealing machine.

Figure 17:
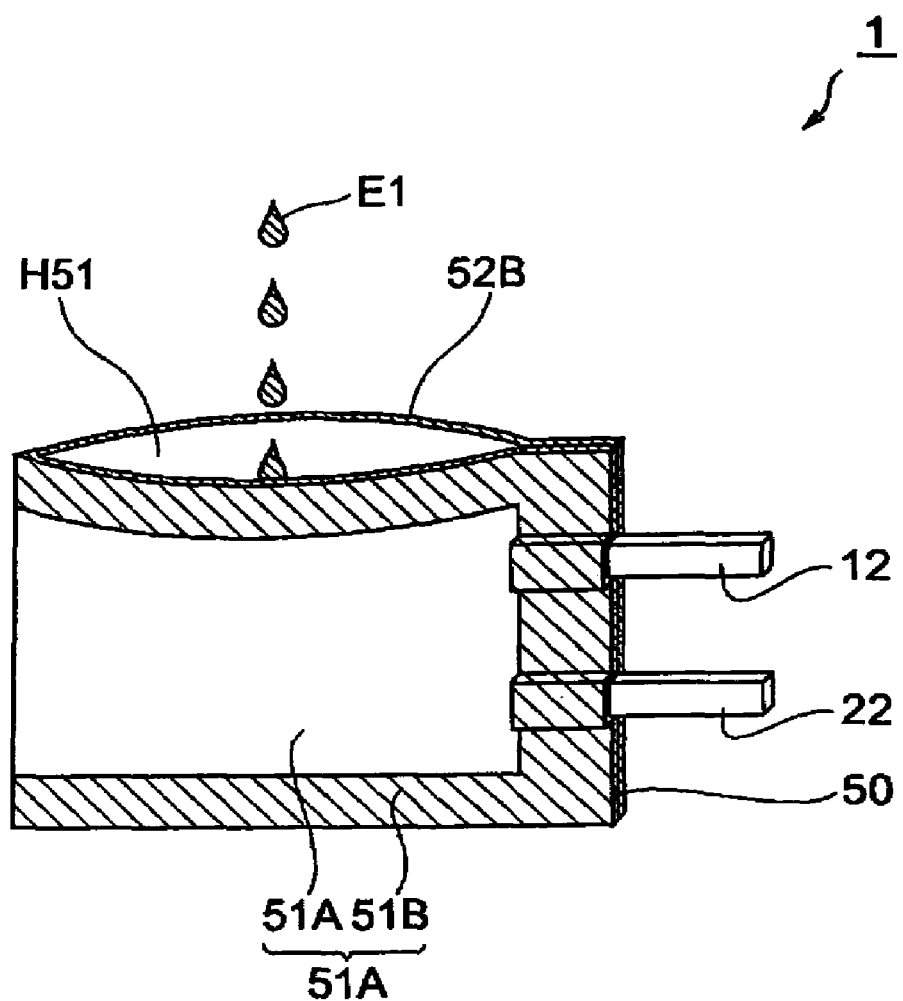
FIG. 17 is a view illustrating an example of procedure for filling a non-aqueous electrolyte solution into the casing.

In this state, as shown in FIG. 17, a section where no heat seal is applied is prepared to keep an opening H51 for pouring the non-aqueous electrolyte solution 30. Thus the casing 50 in a state of having the opening H51 is obtained.

Figure 18:
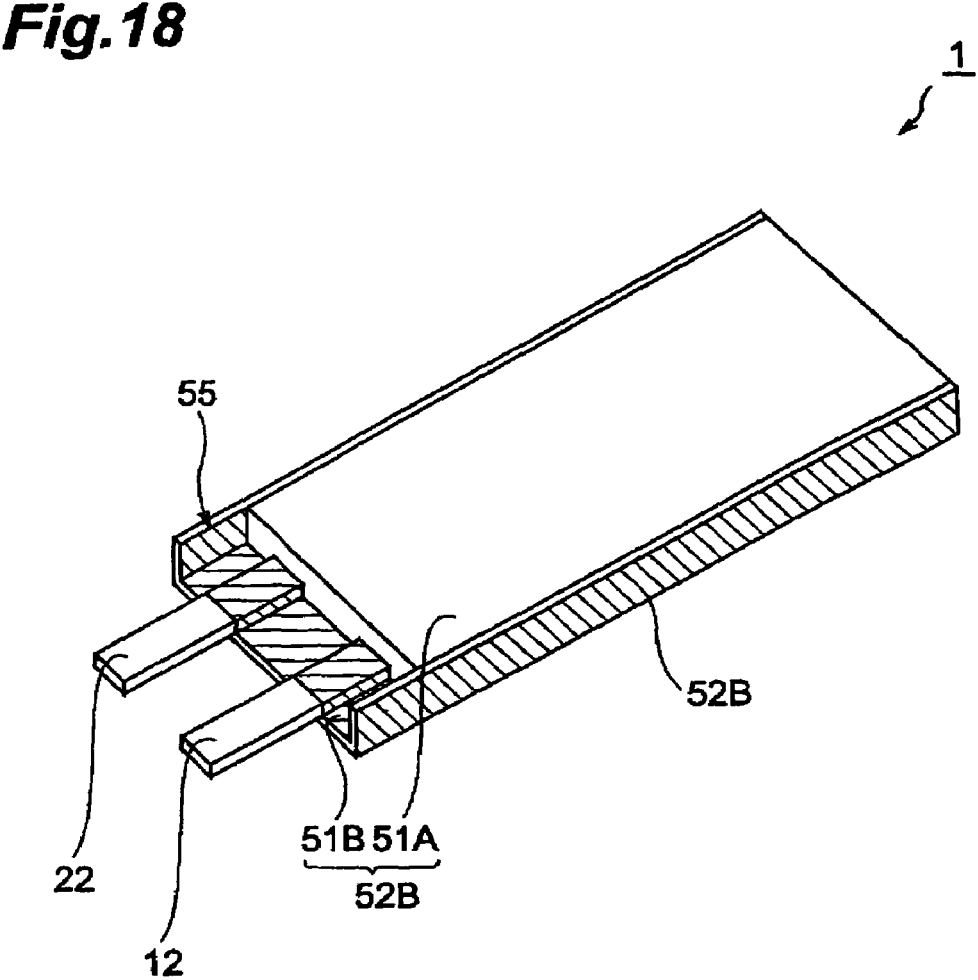
FIG. 18 is a perspective view of the electrochemical capacitor when the seal section of the casing is folded.

As illustrated in FIG. 17, the non-aqueous electrolyte solution 30 is poured into the casing 50 from the opening H51. Then the opening H51 of the casing 50 is sealed using a vacuum-sealing machine. Furthermore, as illustrated in FIG. 18, the seal section 55 of the casing 50 is folded, according to need, to improve the volume energy density on the basis of the volume of space for installing the obtained electrochemical capacitor 1. Thus the fabrication of the casing 50 and the electrochemical capacitor 1 (electric double layer capacitor) is completed.

Since the electrochemical capacitor 1 having such the constitution has the structure of using at least one electrode for electrochemical capacitor (anode 10 or cathode 20) described above, excellent volume capacitance is attained.

Until now, the detail description has been given for the preferred embodiment. The present invention is, however, not limited by the above-given embodiment. For instance, although the irregular profile pattern on the electrode (anode 10 or cathode 20) for electrochemical capacitor in the embodiment adopts the mode of regular arrangement of concavities 91a and convexes 91b in the same shape and same size, respectively, they may have different shapes and sizes or they may be randomly arranged, respectively.

Furthermore, although the above-given embodiment conducts the press-treatment only once by making the third laminate sheet 87 pass between the rollers 85A and 85B, the press-treatment may be given more than once.

Although the above-given description of the embodiment deals with the e electrochemical capacitor 1 provided with one anode 10 and cathode 20, respectively, the electrochemical capacitor may have one or more of the anodes 10 and the cathodes 20, respectively, and one separator 40 may be always placed between each pair of the anode 10 and the cathode 20.

Furthermore, although the above-given description of the embodiment deals mainly with the case of manufacturing the electric double layer capacitor using the method according to the present invention, the electrochemical capacitor which is manufactured by the method according to the present invention is not limited to the electric double layer capacitor, and the manufacturing method according to the present invention is applicable also to the manufacture of electrochemical capacitor such as a dummy capacitance capacitor, pseudo-capacitor, and redox-capacitor or the like.

Hereinafter, the present invention will be described more specifically based on Examples and Comparative Examples, however, the present invention is not intended to be limited to the following Examples.

EXAMPLES 1–8, COMPARATIVE EXAMPLES 1–4

A granular activated carbon (trade name BP-20, produced by Kuraray Chemical Co., Ltd.) and an acetylene black (trade name Denka Black, produced by Denki Kagaku Kogyo K.K.) were blended together in a planetary mixer for 15 minutes. Thus prepared mixture and a fluororubber (trade name Viton-GF, produced by DuPont) were added to 150 parts by mass of MIBK, which were then kneaded in a planetary mixer for 30 minutes. The mixing rates (parts by mass) of the activated carbon, the acetylene black, and the fluororubber are as given in Table 1. Further 150 parts by mass of MIBK was added to the kneaded mixture, which was then agitated for 1 hour to obtain the coating liquor for forming porous body layer.

The obtained coating liquor for forming porous body layer was uniformly applied on one surface of an aluminum foil (20 μm in thickness) using an extrusion-lamination method, and this was then placed in a drier at 100° C. to remove MIBK to obtain a laminate sheet. The laminate sheet was then passed between a pair of rolls each having flat face to press the sheet. Thus an electrode sheet having a porous body layer (150 μm in thickness) formed on one surface of the collector made of aluminum foil was obtained. The press pressure condition of the rolls was 1000 kgf/cm of linear load.

As for Examples 4–8, additional steps described below were given to form an irregular profile pattern on the surface of the porous body layer. That is, the electrode sheet was allowed to pass through the pair of rollers having irregular profile pattern on the face thereof to press the sheet, thus transcripting the irregular profile pattern onto the surface of the porous body layer. The press pressure condition of the rolls was 1000 kgf/cm of linear load. The irregular profile pattern formed on the surface of the porous body layer of the electrode sheet by the press was determined to be similar to the irregular profile pattern shown in FIG. 7.

The obtained electrode sheet was punched to a size of 20 mm×40 mm, which punched sheet was further subjected to vacuum drying at temperatures ranging from 150° C. to 175° C. for 12 hours or more to remove the water adsorbed on the surface of the porous body layer. Thus, the respective electrodes for electrochemical capacitor for Examples 1–8 and Comparative Examples 1–4 were prepared.

TABLE 1

|  | ACTIVATED CARBON | ACETYLENE BLACK | FLUORORUBBER |
|---|---|---|---|
| EXAMPLE 1 | 90 | 1.0 | 9.0 |
| EXAMPLE2 | 90 | — | 10.0 |
| EXAMPLE3 | 92 | — | 8.0 |
| EXAMPLE4 | 90 | 1.0 | 9.0 |
| EXAMPLE5 | 90 | 0.5 | 9.5 |
| EXAMPLE6 | 90 | 1.5 | 8.5 |
| EXAMPLE7 | 90 | — | 10.0 |
| EXAMPLE8 | 92 | — | 8.0 |
| COMPARATIVE EXAMPLE1 | 89 | 5.0 | 6.0 |
| COMPARATIVE EXAMPLE2 | 86 | 5.0 | 9.0 |
| COMPARATIVE EXAMPLE3 | 80 | 10.0 | 10.0 |
| COMPARATIVE EXAMPLE4 | 70 | 10.0 | 20.0 |

[Determination of apparent density]

The apparent density of porous body layer in the respective electrodes for electrochemical capacitor prepared in Examples 1–8 and Comparative Examples 1–4 was calculated based on the mass and thickness of the porous body layer per 100 cm$^2$. The result is given in Table 2.

[Determination of volume capacitance]

The volume capacitance of electrode for electrochemical capacitor fabricated in Examples 1–8 and Comparative Examples 1–4 was determined by the following procedure. First, two of the fabricated electrochemical capacitors were adopted for an anode and a cathode, respectively. Secondly, the anode and the cathode were placed facing each other, and a separator made of regenerated cellulose nonwoven fabric (21 mm×41 mm, 0.05 mm in thickness, trade name TF4050, produced by Nippon Kodoshi Corporation) was placed between the anode and the cathode, thus forming the laminate (element body) having a structure of stacking the anode, separator and cathode in this order, in a contacting state (in a non-joining state). Using the laminate and an electrolyte solution (solution of propylene carbonate containing 1.2 mol/L of triethylmethylammonium borofluoride) a measurement cell for test and evaluation was formed. By discharging the prepared cell under constant current condition, the discharge capacitance of the cell was calculated using the measurement result, and then the volume capacitance was calculated using the derived discharge capacitance and the volume of electrode for electrochemical capacitor. The result is given in Table 2.

[Evaluation of coating film strength]

The coating film strength of the porous body layer of the respective electrodes for electrochemical capacitor fabricated in Examples 1–8 and Comparative Examples 1–4 was evaluated based on the following criterion. The result is given in Table 2.

Criterion for Evaluating the Coating Film Strength:

○: Strength is at a favorable level.

Δ: Satisfactory coating film strength is attained, though some degree of powder separation appeared.

x: Brittle, and difficult to use as an electrode.

TABLE 2

|  | APPARENT DENSITY/ g · cm$^{-3}$ | VOLUME CAPACITANCE/ F · cm$^{-3}$ | COATING FILM STRENGTH |
|---|---|---|---|
| EXAMPLE1 | 0.65 | 16.8 | ○ |
| EXAMPLE2 | 0.62 | 15.3 | ○ |
| EXAMPLE3 | 0.62 | 16.5 | Δ |
| EXAMPLE4 | 0.68 | 17.6 | ○ |
| EXAMPLE5 | 0.65 | 17.3 | ○ |
| EXAMPLE6 | 0.64 | 16.8 | Δ |
| EXAMPLE7 | 0.64 | 16.7 | ○ |
| EXMAPLE8 | 0.64 | 17.1 | Δ |
| COMPARATIVE EXAMPLE1 | 0.57 | 14.7 | X |

TABLE 2-continued

| | APPARENT DENSITY/ g · cm$^{-3}$ | VOLUME CAPACITANCE/ F · cm$^{-3}$ | COATING FILM STRENGTH |
|---|---|---|---|
| COMPARATIVE EXAMPLE2 | 0.58 | 14.5 | X |
| COMPARATIVE EXAMPLE3 | 0.61 | 14.0 | Δ |
| COMPARATIVE EXAMPLE4 | 0.67 | 13.6 | ○ |

As clearly shown in Table 2, it was confirmed that the electrodes for electrochemical capacitor according to the present invention, (Examples 1–8), provide excellent volume capacitance (15 F/cm$^3$ or more) and give satisfactory coating film strength compared with the electrodes for electrochemical capacitor in Comparative Examples 1–4. Particularly, it was confirmed that the electrodes for electrochemical capacitor according to the present invention having irregular profile pattern on the surface of the porous body layer, (Examples 4–8), provide further excellent volume capacitance compared with the electrodes for electrochemical capacitor having no irregular profile pattern on the surface of the porous body layer (Examples 1–3).

As clearly understood from the above-given description, the present invention can provide: an electrode for electrochemical capacitor, having excellent volume capacitance (15 F/cm$^3$ or more, preferably 16 F/cm$^3$ or more, and more preferably 17 F/cm$^3$ or more); a method for manufacturing the electrode for electrochemical capacitor, which method is able to manufacture that type of electrode efficiently and surely; an electrochemical capacitor having excellent electrostatic capacity using the above-described electrode for electrochemical capacitor; and a method for manufacturing electrochemical capacitor, which method is able to manufacture that type of electrochemical capacitor efficiently and surely.

The invention claimed is:

1. An electrode for an electrochemical capacitor, comprising:
a collector having electronic conductivity and a porous body layer having electronic conductivity,
wherein the porous body layer contains porous particles having electronic conductivity and a binder which is able to bind the porous particles with one another, the content of the porous particles in the porous body layer is in a range from 88 to 92% by mass on the basis of the total amount of the porous body layer, the porous body layer including a first surface and a second surface, the first surface facing the collector, the second surface opposing the first surface, and the porous body layer has an apparent density in a range from 0.62 to 0.70 g/cm$^3$ and an irregular profile pattern only on the second surface.

2. The electrode for an electrochemical capacitor as in claim 1, wherein the content of the binder in the porous body layer is in a range from 6.5 to 12% by mass on the basis of the total amount of the porous body layer.

3. The electrode for an electrochemical capacitor as in claim 1, wherein the porous body layer comprises the porous particles in a range from 88 to 92% by mass, the binder in a range from 6.5 to 12% by mass, and a conductive assistant having electronic conductivity in a range from 0 to 1.5% by mass, on the basis of the total amount of the porous body layer.

4. The electrode for an electrochemical capacitor as in claim 3, wherein the conductive assistant is carbon black.

5. The electrode for an electrochemical capacitor as in claim 1, wherein the binder is fluororubber.

6. The electrode for an electrochemical capacitor as in claim 1, wherein the collector is made of aluminum.

7. A method for manufacturing an electrode for electrochemical capacitor containing a collector having electronic conductivity and a porous body layer having electronic conductivity, comprising the steps of:
preparing a coating liquor for forming the porous body layer, the coating liquor containing porous particles having electronic conductivity, a binder which is able to bind the porous particles with one another and a liquid capable of dissolving or dispersing the binder therein so that the content of the porous particles in the coating liquor falls within 88 to 92% by mass on the basis of the total amount of solid matter in the coating liquor;
forming the porous body layer by applying the coating liquor for forming the porous body layer onto surface of the collector, followed by removing the liquid to form the porous body layer; and
pressing the collector and the porous body layer together so that the apparent density of the porous body layer falls within 0.62 to 0.70 g/cm$^3$ and the porous body layer has an irregular profile pattern only on a surface opposite of the collector.

8. The method for manufacturing an electrode for electrochemical capacitor as in claim 7, wherein the content of the binder in the coating liquor for forming the porous body layer is in a range from 6.5 to 12% by mass on the basis of the total amount of solid matter in the coating liquor for forming the porous body layer.

9. The method for manufacturing an electrode for electrochemical capacitor as in claim 7, wherein the coating liquor for forming the porous body layer comprises the porous particles in a range from 88 to 92% by mass, the binder in a range from 6.5 to 12% by mass, a conductive assistant having electronic conductivity in a range from 0 to 1.5% by mass, and the liquid, based on the total amount of solid matter in the coating liquor.

10. The method for manufacturing an electrode for electrochemical capacitor as in claim 7, wherein the pressing step is the step of pressing the collector and the porous body layer together by a roll-press.

11. The method for manufacturing an electrode for electrochemical capacitor as in claim 7, wherein the pressing step includes pressing the collector and the porous body layer together using a cylindrical roller having an irregular profile pattern on the face thereof to bring the face of the roller into contact with the surface of the porous body layer to form the irregular profile pattern on the surface of the porous body.

12. An electrochemical capacitor comprising:
a first electrode and a second electrode facing each other;
a separator positioned between the first electrode and the second electrode; and
an electrolyte solution;
a casing which contains to seal the first electrode, the second electrode, the separator and the electrolyte solution,
wherein:
at least one of the first electrode and the second electrode is an electrode for electrochemical capacitor provided with a collector having electronic conductivity and a porous body layer having electronic conductivity, the porous body layer contains porous particles having electronic conductivity and a binder which is able to bind the porous particles with one another, the content of the porous particles in the porous body layer is in a range from 88 to 92% by mass on the basis of the total amount of the porous body layer, the porous body layer includes a first surface and a second surface, the first surface facing the collector, the second surface opposing the first surface, and the porous body layer has an apparent density in a range from 0.62 to 0.70 g/cm$^3$ and an irregular profile pattern only on the second surface.

13. The electrochemical capacitor as in claim 12, wherein the content of the binder in the porous body layer is in a range from 6.5 to 12% by mass on the basis of the total amount of the porous body layer.

14. The electrochemical capacitor as in claim 12, wherein the porous body layer comprises the porous particles in a range from 88 to 92% by mass, the binder in a range from 6.5 to 12% by mass, and a conductive assistant having electronic conductivity in a range from 0 to 1.5% by mass, on the basis of the total amount of the porous body layer.

15. The electrochemical capacitor as in claim 14, wherein the conductive assistant is carbon black.

16. The electrode for an electrochemical capacitor as in claim 12, wherein the binder is fluororubber.

17. The electrode for an electrochemical capacitor as in claim 12, wherein the collector is made of aluminum.

18. A method for manufacturing an electrochemical capacitor containing a first electrode and a second electrode facing each other, a separator positioned between the first electrode and the second electrode, an electrolyte solution, a casing which contains to seal the first electrode, the second electrode, the separator and the electrolyte solution, the method comprising the steps of:

a first step of fabricating the first electrode and the second electrode;

a second step of positioning the separator between the first electrode and the second electrode;

a third step of encasing the first electrode, the second electrode and the separator in the casing;

a fourth step of pouring the electrolyte solution in the casing; and a fifth step of sealing the casing, wherein at least one of the first electrode and the second electrode is fabricated in the first step by the steps of: preparing a coating liquor for forming porous body layer, the coating liquor containing porous particles having electronic conductivity, a binder which is able to bind the porous particles with one another and a liquid which is able to dissolve or to disperse the binder therein, so that the content of the porous particles in the coating liquor falls within 88 to 92% by mass on the basis of the total amount of solid matter in the coating liquor;

forming the porous body layer by applying the coating liquor for forming the porous body layer onto surface of the collector, followed by removing the liquid to form the porous body layer; and pressing the collector and the porous body layer together so that an apparent density of the porous body layer falls within 0.62 to 0.70 g/cm$^3$ and the porous body layer has an irregular profile pattern only on a surface opposite of the collector, to give an electrode for an electrochemical capacitor.

19. The method for manufacturing an electrode for electrochemical capacitor as in claim 18, wherein the content of the binder in the coating liquor for forming the porous body layer is in a range from 6.5 to 12% by mass on the basis of the total amount of solid matter in the coating liquor for forming the porous body layer.

20. The method for manufacturing an electrochemical capacitor as in claim 18, wherein the coating liquor for forming the porous body layer comprises the porous particles in a range from 88 to 92% by mass, the binder in a range from 6.5 to 12% by mass and a conductive assistant having electronic conductivity in a range from 0 to 1.5% by mass on the basis of the total amount of solid matter in the porous body layer, and the liquid.

21. The method for manufacturing an electrochemical capacitor as in claim 18, wherein the pressing step is the step of pressing the collector and the porous body layer together by a roll-press.

22. The method for manufacturing an electrochemical capacitor as in claim 18, wherein the pressing step includes pressing the collector and the porous body layer together using a cylindrical roller having an irregular profile pattern on the face thereof to bring the face of the roller into contact with the surface of the porous body layer to form the irregular profile pattern on the surface of the porous body layer.

* * * * *